(12) United States Patent
Bandekar et al.

(10) Patent No.: US 12,261,773 B2
(45) Date of Patent: *Mar. 25, 2025

(54) EGRESS PIPELINE WITH TAG MANIPULATION AND ESI LABEL PUSH CAPABILITY

(71) Applicant: Arista Networks, Inc., Santa Clara, CA (US)

(72) Inventors: Vishal Bandekar, Bangalore (IN); Digvijay Singh Gahlot, Bangalore (IN); Ramakrishnan Ganapathy Iyer, Trivandrum (IN); Legena Puthanpurayil Kuttipunathil, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,646

(22) Filed: May 13, 2024

(65) Prior Publication Data
US 2024/0372804 A1 Nov. 7, 2024

Related U.S. Application Data

(63) Continuation of application No. 17/718,887, filed on Apr. 12, 2022, now Pat. No. 12,010,015.

(51) Int. Cl.
*H04L 45/50* (2022.01)
*H04L 12/46* (2006.01)
*H04L 45/00* (2022.01)
*H04L 45/42* (2022.01)

(52) U.S. Cl.
CPC .......... *H04L 45/50* (2013.01); *H04L 12/4641* (2013.01); *H04L 45/42* (2013.01); *H04L 45/66* (2013.01)

(58) Field of Classification Search
CPC ..... H04L 45/50; H04L 12/4641; H04L 45/42; H04L 45/66; H04L 12/4633; H04L 12/4645
See application file for complete search history.

(56) References Cited

U.S. PATENT DOCUMENTS

| | | |
|---|---|---|
| 8,817,807 B2 | 8/2014 | Suzuki et al. |
| 12,010,015 B2 | 6/2024 | Bandekar et al. |
| 2007/0286204 A1 | 12/2007 | Ould-Brahim |
| 2008/0240113 A1* | 10/2008 | Arad ............... H04L 12/66 370/395.53 |
| 2009/0135833 A1 | 5/2009 | Lee et al. |
| 2011/0216772 A1 | 9/2011 | Mohan et al. |
| 2014/0241358 A1* | 8/2014 | Bosshart ......... H04L 45/74591 370/392 |
| 2016/0337251 A1 | 11/2016 | Venkataramanan et al. |
| 2023/0031683 A1 | 2/2023 | Jiang et al. |

* cited by examiner

*Primary Examiner* — Sm A Rahman
(74) *Attorney, Agent, or Firm* — Fountainhead Law Group, PC

(57) ABSTRACT

Packet processing in a EVPN L2 MPLS deployment includes performing tag editing operations in the egress pipeline. More particularly, tag manipulation is based on the egress port. Packet processing further includes performing ESI label selection in the egress pipeline, and includes selecting the ESI label based on the ingress port where the ingress port can be a physical port or a subinterface configured on a physical port.

20 Claims, 16 Drawing Sheets

VID to bridged VLAN mapping (PE 514-1)

| | port | VID | bridged VLAN |
|---|---|---|---|
| 1 | et11 | VID = 10 | bridged VLAN 10 |
| 2 | et11 | VID = 50 | bridged VLAN 30 |
| 3 | et12 | VID = 100 | bridged VLAN 10 |
| | ⋮ | ⋮ | ⋮ |

VID to bridged VLAN mapping (PE 814-1)

| | port | VID | bridged VLAN |
|---|---|---|---|
| 1 | et10.1 | VID = 10 | bridged VLAN 10 |
| 2 | et10.2 | VID = 100 | bridged VLAN 10 |
| | ⋮ | ⋮ | ⋮ |

EGRESS PIPELINE WITH TAG MANIPULATION AND ESI LABEL PUSH CAPABILITY

BACKGROUND

The present disclosure generally relates to an Ethernet virtual private network (EVPN) multi-protocol label switching (MPLS) deployment.

EVPN logically extends a Layer 2 (L2) domain across a wide area network. EVPN uses VPN techniques to carry L2 traffic across the network. EVPN can use MPLS as the underlying network. From the point of view of host machines, the host machines see a deployment of virtual local area networks (VLANs). Devices at the edge of the MPLS network allow host machines to bridge to other VLANs, for example, to send Broadcast, Unknown unicast, Multicast (BUM) traffic. The edge devices perform EVPN and MPLS encapsulation to send traffic into the network, and perform decapsulation when receiving traffic from the network to be forwarded to the host machines. The present disclosure relates to processing packets in an EVPN MPLS deployment.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
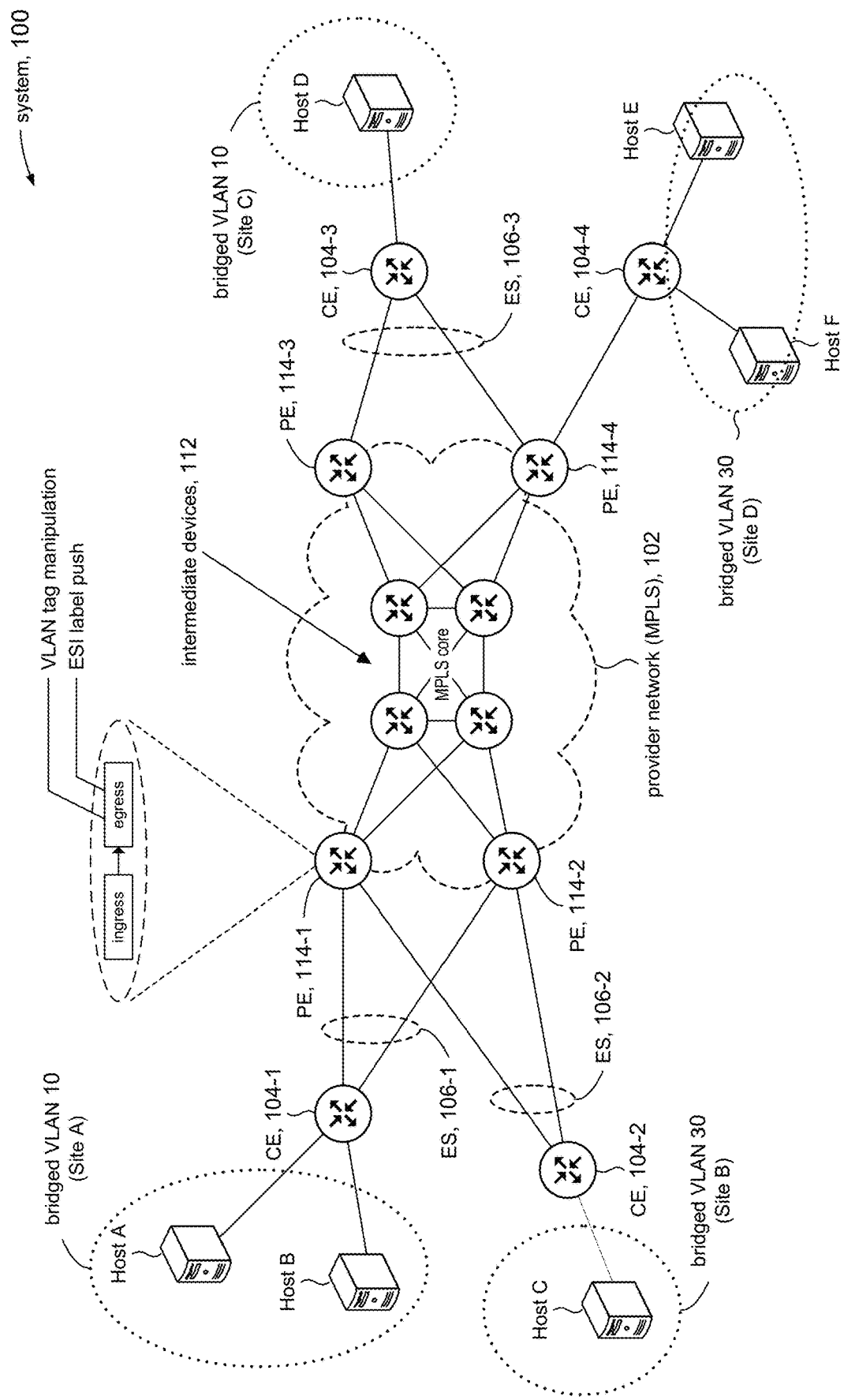
FIG. 1 is an illustrative EVPN MPLS deployment to illustrate aspects of the present disclosure.

FIG. 1 shows an illustrative EVPN MPLS deployment (system) 100. System 100 comprises a network 102, customer edge devices 104, and provider edge devices 114 to support communication among host machines (e.g., Host A, Host B, etc.). An EVPN MPLS network (provider network 102) provides a single virtual Layer 2 (L2) domain for host machines connected to the network. System 100 shows two bridge domains comprising bridged VLANs. For example, a bridge domain identified as bridged VLAN 10 comprises two sites, Site A and Site C, that are bridged by provider network 102. Likewise, a bridge domain identified as bridged VLAN 30 comprises two sites, Site B and Site D, that are also bridged by provider network 102.

MPLS is a well known networking technology. Briefly, a packet arrives at one end of the MPLS network via normal transport mechanisms (e.g., IP routing). When the packet enters the MPLS network (core), it is assigned to a forwarding equivalence class (FEC). Based on the FEC, a label is appended to (pushed on) the packet. As the packet moves through the core, network devices in the core direct the packet according to the label. At the other end of the core, the label is removed (popped off) and the packet is delivered via normal transport such as IP routing.

Continuing with FIG. 1, provider network 102 includes an MPLS core comprising intermediate network devices 112, which in the MPLS context are referred to as label switch routers (LSRs). Provider edge devices (PEs) 114 serve as endpoint devices of provider network 102 for entry to and exit from the network. PEs 114 can be referred to as label edge routers in the MPLS context. PEs 114 can include network devices (switches, routers, etc.) that operate in accordance with the present disclosure.

Host machines (e.g., Host A, Host B, etc.) can connect to provider network 102 via respective customer edge devices (CEs) 104 that connect to the respective PEs 114. The host machines can be servers, user devices such as laptop computers, desktop systems, and the like. CEs 104 can include any suitable network device such as a switch, a router, and the like.

As shown in FIG. 1, CE 104-4 is configured for single homing. In other words, CE 104-4 has a single link to PE 114-4. Merely for discussion purposes and without loss of generality, CEs 104-1, 104-2, 104-3 can be configured for multihoming. Link Aggregation Group (LAG) technology is an example of multihoming where multiple physical ports on a network device appear as a single "logical" port. In the illustrative deployment of FIG. 1, CE 104-1 is shown to be multihomed to PEs 114-1, 114-2. There is a link (connection) between a physical port on CE 104-1 and a physical port on PE 114-1, and there is another link between another physical port on CE 104-1 and a physical port on PE 114-2. The two links can be collectively referred to as Ethernet segment (ES) 106-1. CE 104-1 can transmit data (packets) to provider network 102 on either of the two links. Conversely, data from provider network 102 destined for CE 104-1 can be transmitted to the CE on either of the two links. CEs 104-2, 104-3 shown in FIG. 1 are likewise multihomed on respective ESs 106-2, 106-3.

PEs 114 can be configured to receive, process, and forward packets in pipeline fashion. As FIG. 1 shows, in some embodiments, packet processing pipelines in a PE (e.g., PE 114-1) can be configured as ingress pipelines and separate egress pipelines. In accordance with the present disclosure, certain functionality such as VLAN tag manipulation and ES identifier (ESI) label push can be performed in the egress pipelines. These aspects of the present disclosure are discussed in more detail below.

The discussion will now turn to a description of packet formats for various data packets that are transmitted in system 100. Packets described in the present disclosure are well known and understood, and so only a brief description of the relevant data fields (components) of the packets will be given.

Figure 2A:
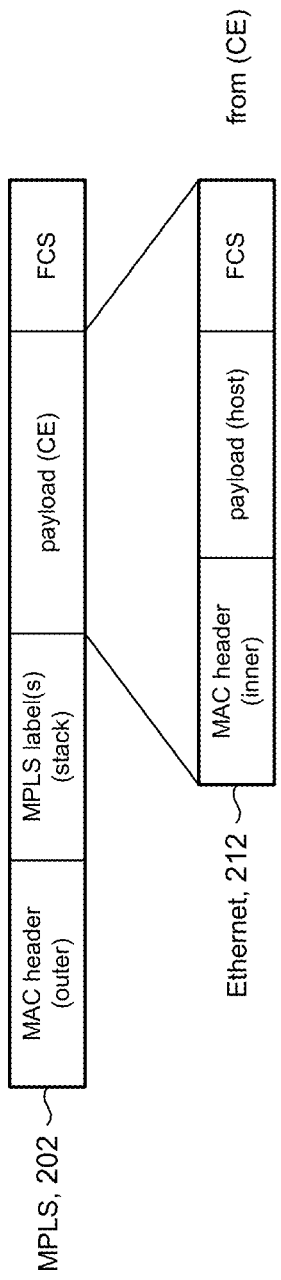
FIGS. 2A and 2B show examples of packets.

FIG. 2A shows the general format for an MPLS packet 202. Packets that are transmitted within an MPLS network (e.g., provider network 102) generally have this format, including packets sent between PEs 114 and the MPLS core and packets within the MPLS core. The media access control (MAC) header component of an MPLS packet includes information such as the destination MAC (DMAC) and the source MAC (SMAC) addresses which represent, respectively, the MAC addresses of the receiving (destination) device and the sending device (source). Strictly speaking, packet 202 is an Ethernet frame that encapsulates an MPLS packet. That distinction, however, is not relevant to the present disclosure; MPLS packet 202 can be loosely referred to as an MPLS packet.

The MPLS labels component (also referred to as the MPLS stack) of MPLS packet 202 contains one or more labels that are used by MPLS to forward packets within the MPLS core. Labels are used to switch the packet through the MPLS core. MPLS packet 202 encapsulates in its payload a data packet received from a device (e.g., CE 104) connected to the MPLS network. In FIG. 1, for example, PE 114-1 can receive a packet from CE 104-1. PE 114-1 would encapsulate the packet received from CE 114-1 as the payload of MPLS packet 202. In some embodiments, the packet received from CE-114-1 can be an Ethernet frame.

FIG. 2A shows an Ethernet frame 212 encapsulated within MPLS packet 202. The MAC header of Ethernet frame 212 includes information such as the destination MAC (DMAC) address to which the Ethernet frame is transmitted and the source MAC (SMAC) address from which the Ethernet frame was sent. The payload component in the Ethernet frame can be a packet of data sent by a host to a CE. The MAC header of Ethernet frame 212 can also be referred to as the "inner" MAC header to distinguish the "outer" MAC header of the MPLS packet 202 that encapsulates the Ethernet frame.

Figure 2B:
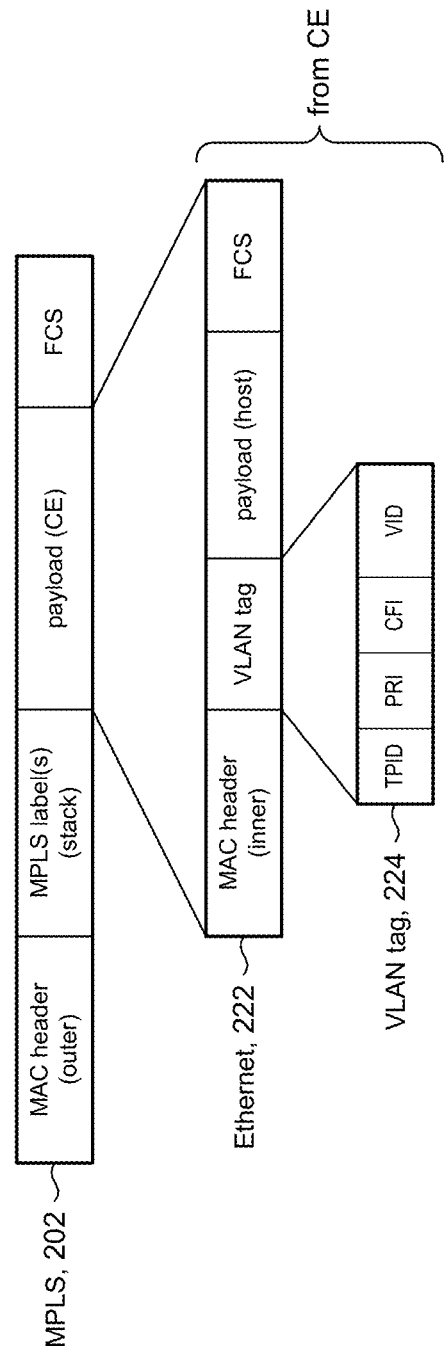

FIG. 2B shows an example of an Ethernet packet 222 that is tagged with a VLAN tag 224. VLANs and VLAN tagging are known. Packets on a VLAN are "tagged" with an identifier, referred to as the VLAN tag, so that the network knows how to forward the packets within a VLAN and forward the packet after mapping the VLAN tag to a bridge domain. As shown in FIG. 2B, VLAN tag 224 includes a VLAN identifier (VID). The VID generally identifies the VLAN that a packet belongs to, but in the context of EVPN MPLS, PE devices can be configured to provide mapping between the VID in a received packet and a bridge domain. This aspect of the present disclosure is discussed in more detail below.

Figure 3:
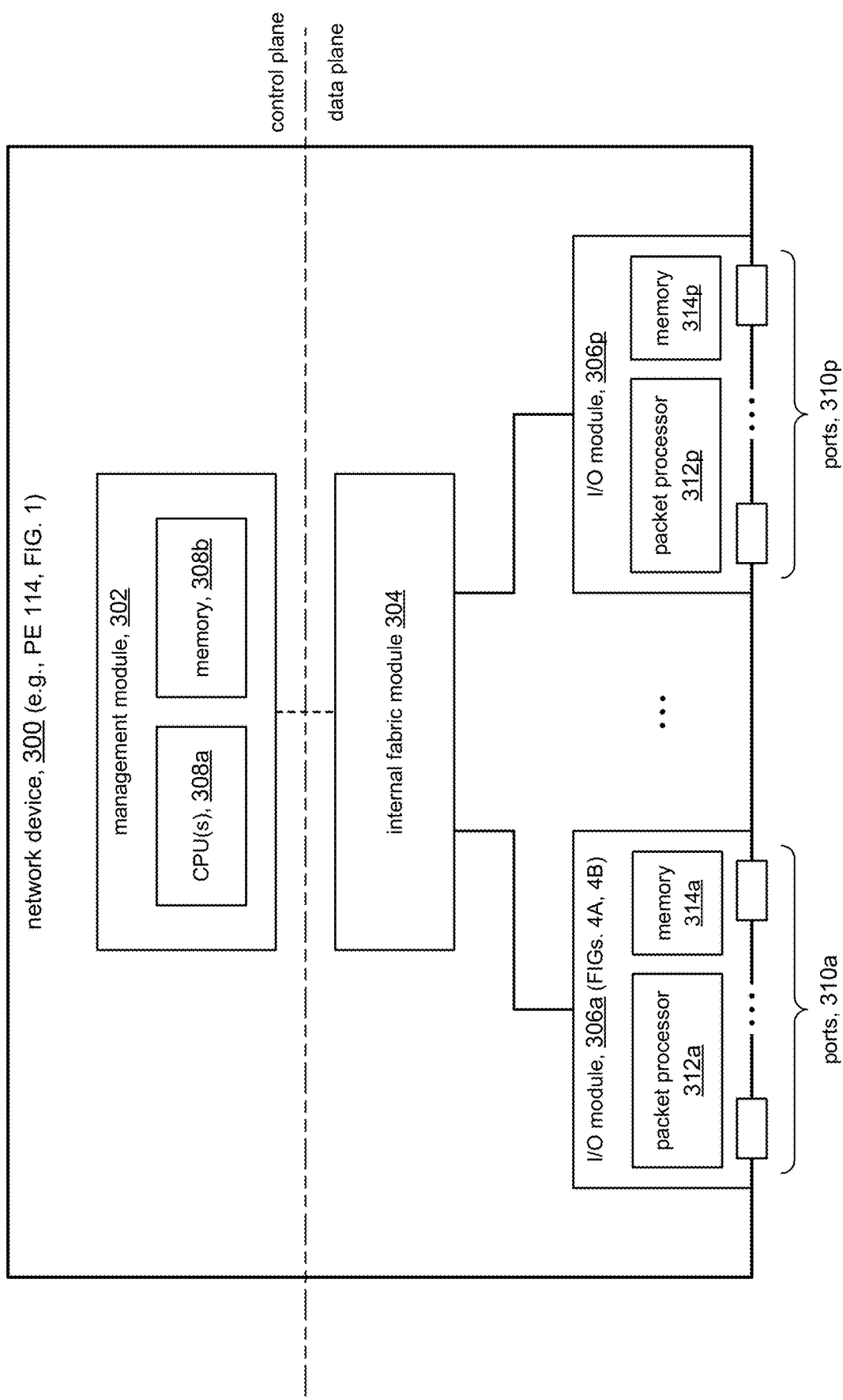
FIG. 3 is an illustrative hardware configuration of a network device such as a customer edge device and a provider edge device.

FIG. 3 depicts an example of a network device 300 (e.g., PE 114, FIG. 1) in accordance with some embodiments of the present disclosure. As shown, network device 300 can include a management module 302, an internal fabric module 304, and one or more I/O modules 306a-306p. Management module 302 includes the control plane (also referred to as a control layer) of network device 300 and can include one or more management CPUs 308a for managing and controlling operation of network device 300. Each management CPU 308a can be a general purpose processor, such as but not limited to an Intel®/AMD® x86 or ARM® processor, that operates under the control of software stored in a memory 308b, such as dynamic random access memory (DRAM). The control plane provides processes to determine which path to use, such as routing protocols, spanning tree learning, and the like.

Internal fabric module 304 and I/O modules 306a-306p collectively represent the data plane of network device 300 (also referred to as the data layer, the forwarding plane, etc.). Internal fabric module 304 serves to interconnect the various other modules of network device 300. Each I/O module 306a-306p includes one or more input/output ports 310a-310p that are used by network device 300 to send and receive network packets. Each I/O module 306a-306p provides packet processing functionality, logically represented by respective packet processors 312a-312p and memory components 314a-314p. Each packet processor 312a-312p can comprise a forwarding hardware component, comprising for example, elements such as application specific integrated circuit (ASIC), field programmable gate array (FPGA), digital processing unit, content-addressable memory, and the like. The forwarding hardware component can be configured to make wire speed decisions on how to handle incoming (ingress) and outgoing (egress) network packets. In accordance with some embodiments some aspects of the present disclosure can be performed wholly within the data plane. The memory components can hold information for processing in accordance with the present disclosure.

Figure 4A:
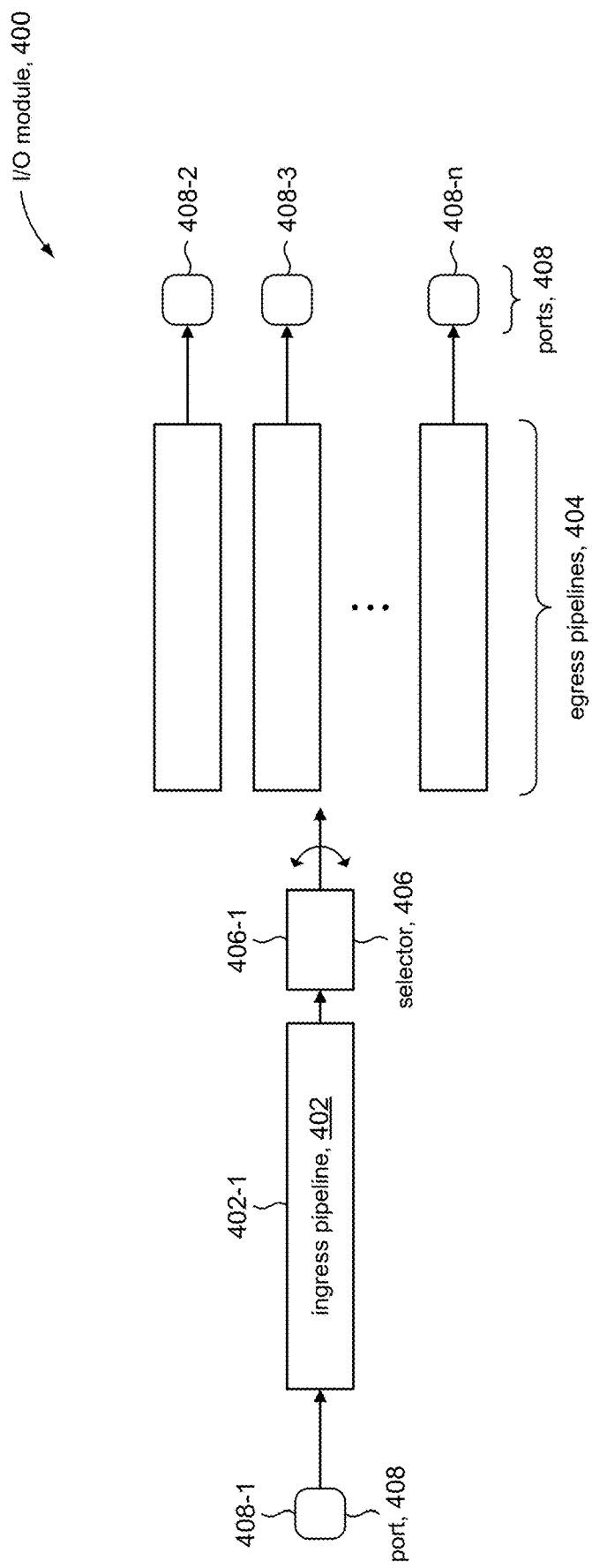
FIGS. 4A and 4B are high level diagrams of ingress and egress pipelines.

FIG. 4A shows a high level representation of an I/O module 400 in accordance with some embodiments. The N physical ports 408 on I/O module 400 have corresponding ingress pipelines 402 to process ingress packets and corresponding egress pipelines 404 to process packets for egress. Each ingress pipeline includes selection circuitry (selector) 406 to direct intermediate packets that exit the ingress pipeline to an appropriate egress pipeline. The ingress pipelines and egress pipelines can be separate components. In some embodiments, for example, the ingress pipeline and the egress pipeline can be implemented using separate circuitry. In other embodiments, the ingress pipeline and the egress pipeline can be implemented on separate IC (integrated circuit) chips.

Each port 408 has a corresponding ingress pipeline 402 to process packets that ingress the port and a corresponding egress pipeline 404 to process packets for egress on the port. The ingress port (e.g., a port 408-x, not shown) and the egress port (e.g., a port 408-y, not shown) for a given packet may be different ports. A packet that is received on port 408-x is processed by associated ingress pipeline 402-x, may be sent via respective selector 406-x to an egress pipeline 404-y that is associated with port 408-y different from port 408-x.

Figure 4B:
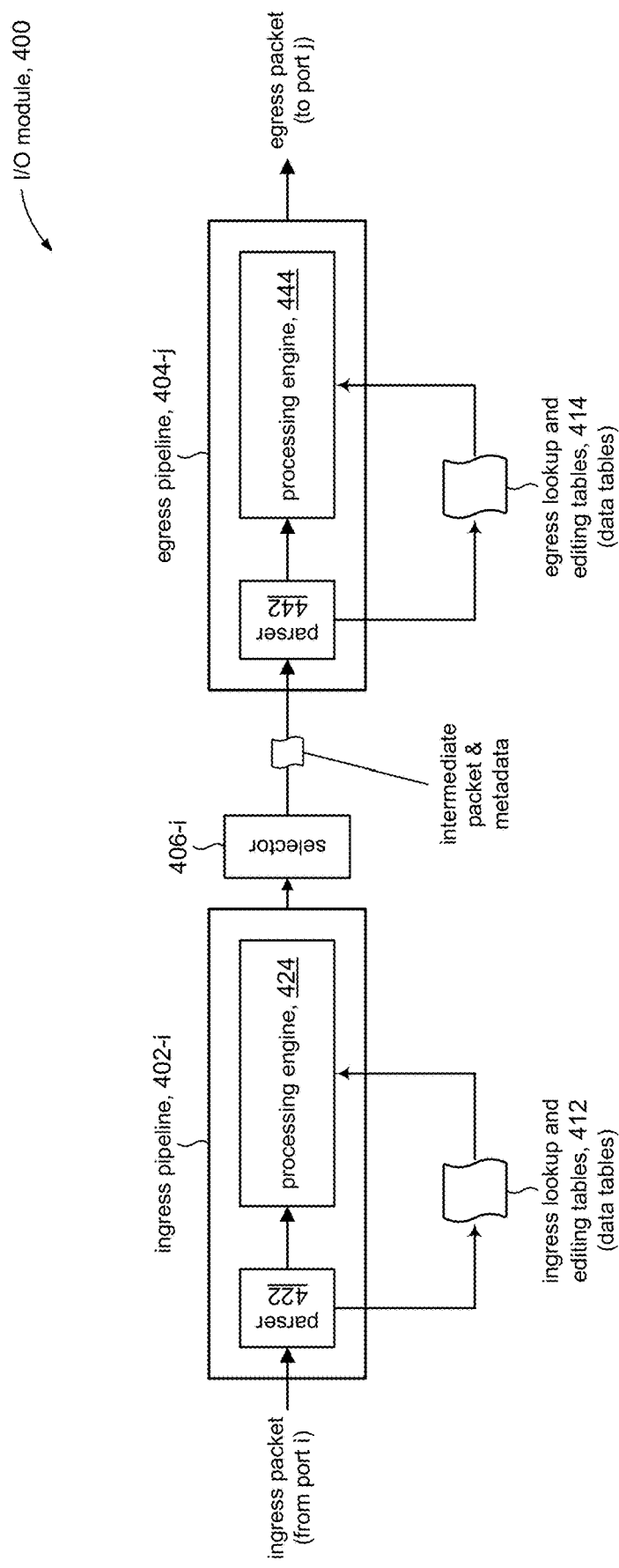

FIG. 4B shows some details of ingress and egress pipelines in accordance with some embodiments. The example in FIG. 4B shows ingress pipeline 402-*i* to process packets that ingress on port i, and egress pipeline 404-*j* to process packets for egress on port j.

Ingress pipeline 402-*i* can include a parser 422 and a processing engine 424. The ingress pipeline can use ingress lookup and editing tables (ingress data tables) 412 to provide editing instructions based on the contents of the ingress packet to drive processing engine 424. Generally, when a packet is received (ingresses) on a port of the network device, the ingress packet feeds into the ingress pipeline associated with that port. Parser 422 parses the ingress packet to access parts of the packet. Various lookups can be performed using ingress data tables 412 to obtain editing instructions that feed into processing engine 424 to direct editing actions to be performed on the ingress packet. In some instances parts of the ingress packet may be modified, and in other instances the ingress packet may not be edited. For discussion purposes, in either case the packet that leaves the ingress pipeline will be referred to as an "intermediate packet." Parts of the ingress packet can be used as keys into the ingress data tables to produce metadata that can be used to identify an egress pipeline and to direct processing in the egress pipeline. The ingress packet and metadata can collectively constitute the intermediate packet.

The intermediate packet produced by ingress pipeline 402-*i* can be forwarded by corresponding selector 406-*i* to an appropriate egress pipeline; e.g., egress pipeline 404-*j*. In some embodiments, the selector can select the egress pipeline based on information contained in the intermediate packet and/or on the metadata.

Similar to ingress pipeline 402-*i*, egress pipeline 404-*j* can include a parser 442 and a processing engine 444. The egress pipeline can access egress lookup and editing tables (egress data tables) 414 to provide editing instructions to processing engine 444. Generally, when selector 406-*i* transmits a packet the egress pipeline, parser 442 can parse the received packet to access parts of the packet. Various lookups can be performed on the egress data tables 414 using the parsed packet and the metadata produced by the ingress pipeline or the egress pipeline to obtain appropriate editing instructions that feed into processing engine 444 to direct actions performed by processing engine to produce an egress packet.

Payload Tag Manipulation

Figure 5:
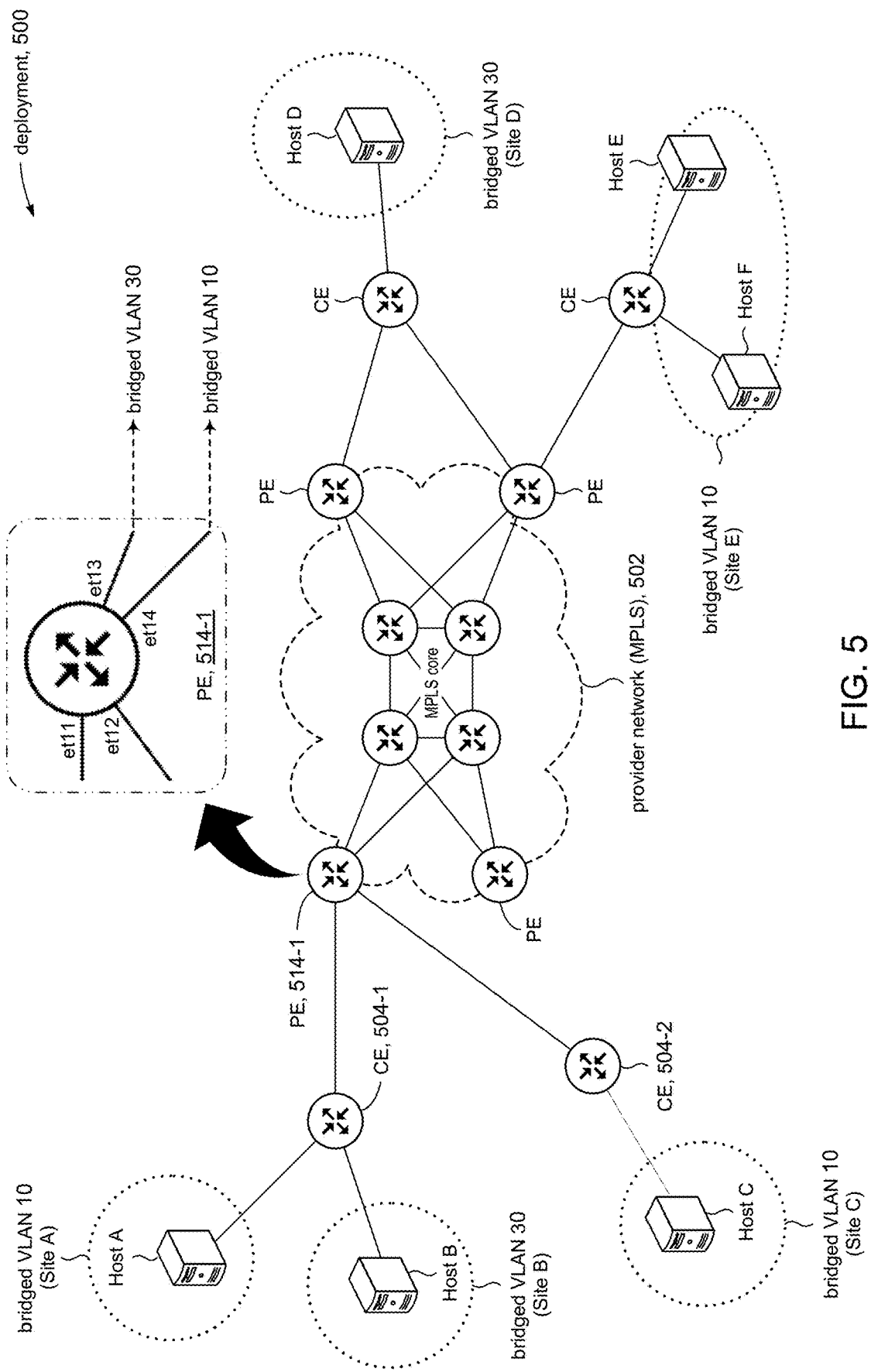
FIG. 5 shows an EVPN MPLS deployment to illustrate tag manipulation in accordance with the present disclosure.

FIG. 5 shows details in an EVPN MPLS deployment 500 to illustrate an example of payload tag manipulation in accordance with some embodiments. The deployment comprises provider network 502 and CEs 504, which in this example are configured for single homing, although it will be appreciated that the deployment can include multi-homed CEs. Host A and Host B are connected to CE 504-1; and CE 504-1, in turn, connects to physical port et11 on PE 514-1. Host C connects to CE 504-2; and CE 504-2, in turn, connects to physical port et12 on PE 514-1.

Deployment 500 is configured with two bridge domains. A bridge domain identified as bridged VLAN 10 comprises three sites: Site A comprising Host A, Site C comprising Host C, and Site E comprising Host E and Host F. Another bridge domain identified as bridged VLAN 30 comprises two sites: Site B comprising Host B and Site D comprising Host D.

Figure 6A:
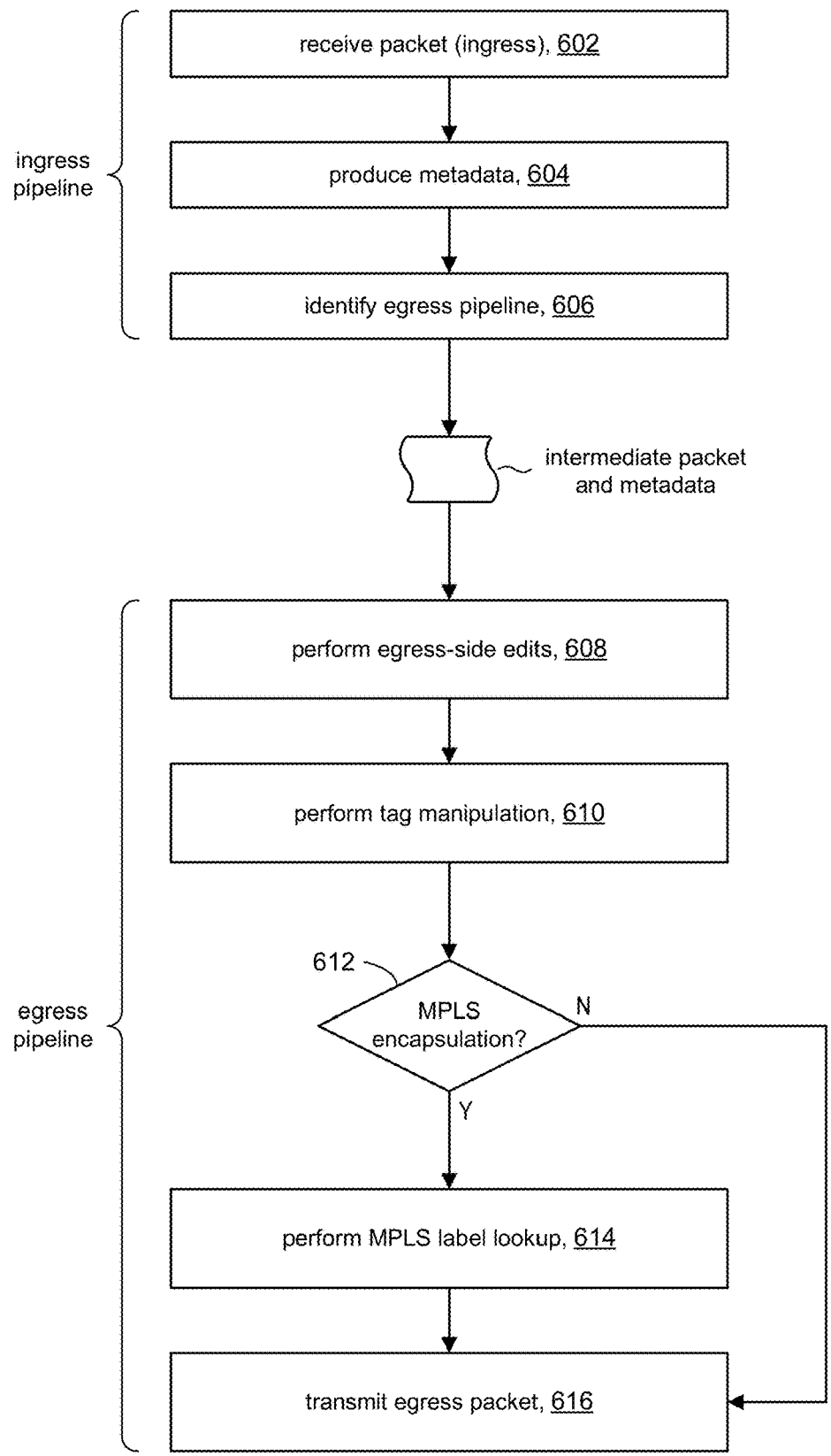
FIG. 6A is a high level flow of tag manipulation in accordance with the present disclosure.

Referring to FIG. 6A, the discussion will now turn to a high-level description of processing in a network device (e.g., PE 514-1, FIG. 5) for tag manipulation of an ingress packet in accordance with the present disclosure. In some embodiments, for example, the network device can include one or more digital processing units, which when operated, can cause the network device to perform processing in accordance with FIG. 6A. Digital processing units can include specialized processors in the data plane such as digital signal processors, field programmable gate arrays, application specific integrated circuits, and the like that operate by way of executing computer program code or by way of logic circuits being configured for specific operations. For example, packet forwarding logic 312 (FIG. 3) in the data plane can be an ASIC.

At operation 602, the network device can receive a packet (the ingress packet) at one of its ports (the ingress port). The ingress packet can be provided to the ingress pipeline associated with the ingress port.

Figure 7:
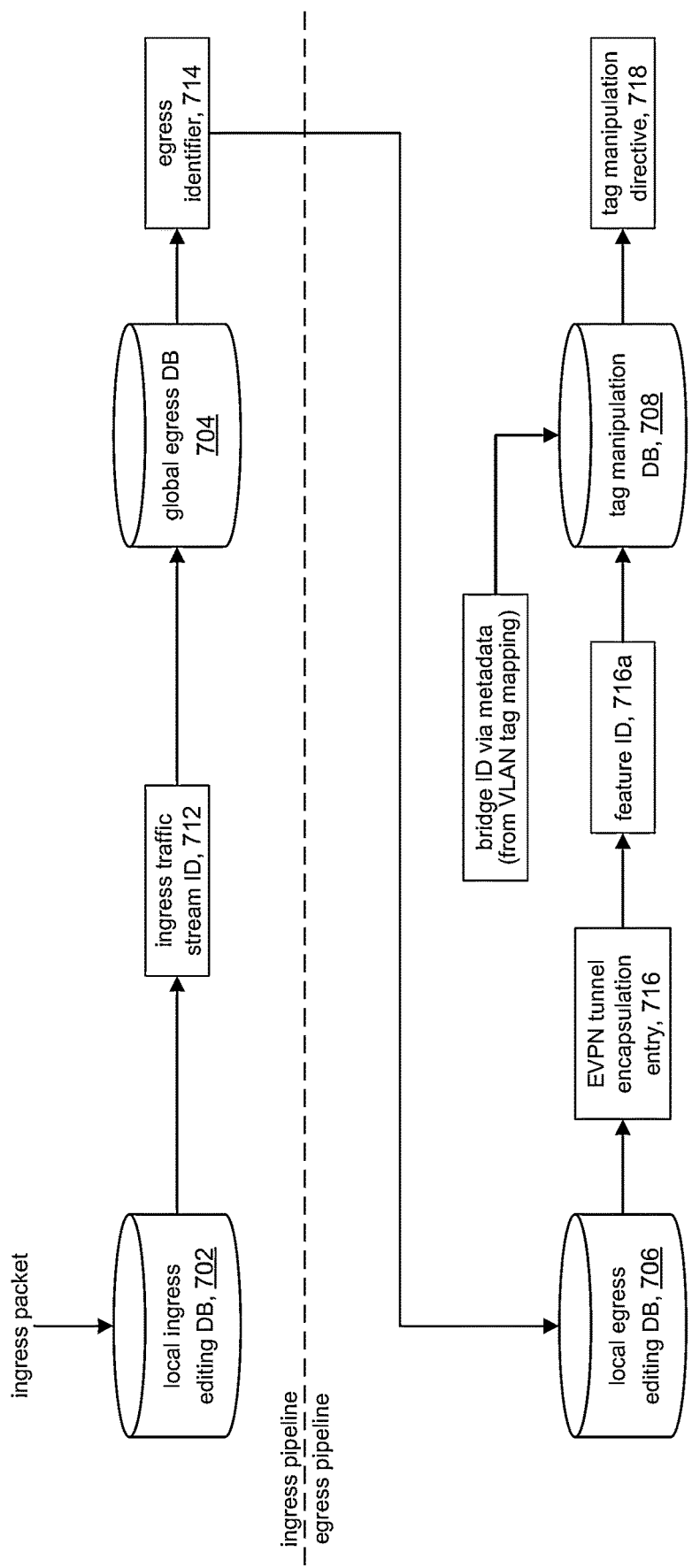
FIG. 7 shows ingress and egress data tables to support tag manipulation in accordance with the present disclosure.

At operation 604, processing in the ingress pipeline can produce metadata for further downstream processing. The ingress pipeline outputs the ingress packet as an intermediate packet. In some instances, the ingress pipeline may perform edits on the ingress packet, and in other instances the ingress packet may not be edited. Information contained in the ingress packet can be used as lookup keys on the ingress data tables (e.g., 412, FIG. 4B) associated with the ingress pipeline to identify editing directives and metadata. Referring for a moment to FIG. 7, for example, the ingress data tables can include a local ingress editing database (DB) 702; this database is "local" in the sense that it is specific to the ingress pipeline. The metadata can include an ingress traffic stream identifier (ID) 712 that identifies the traffic stream of the ingress packet and, as shown below, the ingress traffic stream ID can be used to identify an egress pipeline.

The metadata can further include information (a bridge ID) that identifies the bridged VLAN in which to bridge the ingress packet. Depending on configuration, an incoming packet can be bridged in a bridged VLAN. In some embodiments, for example, the bridged VLAN is determined based on the VID contained in the ingress packet; the VID can be mapped (translated) to a bridged VLAN. The mapping can be to the same or a different bridged VLAN as the sending host. The mapping between VID and bridged VLAN depends on a particular given deployment and is configured in each PE device on a port by port basis by a network administrator or some suitable automation (e.g., a central controller).

Figures 6B, 6C:
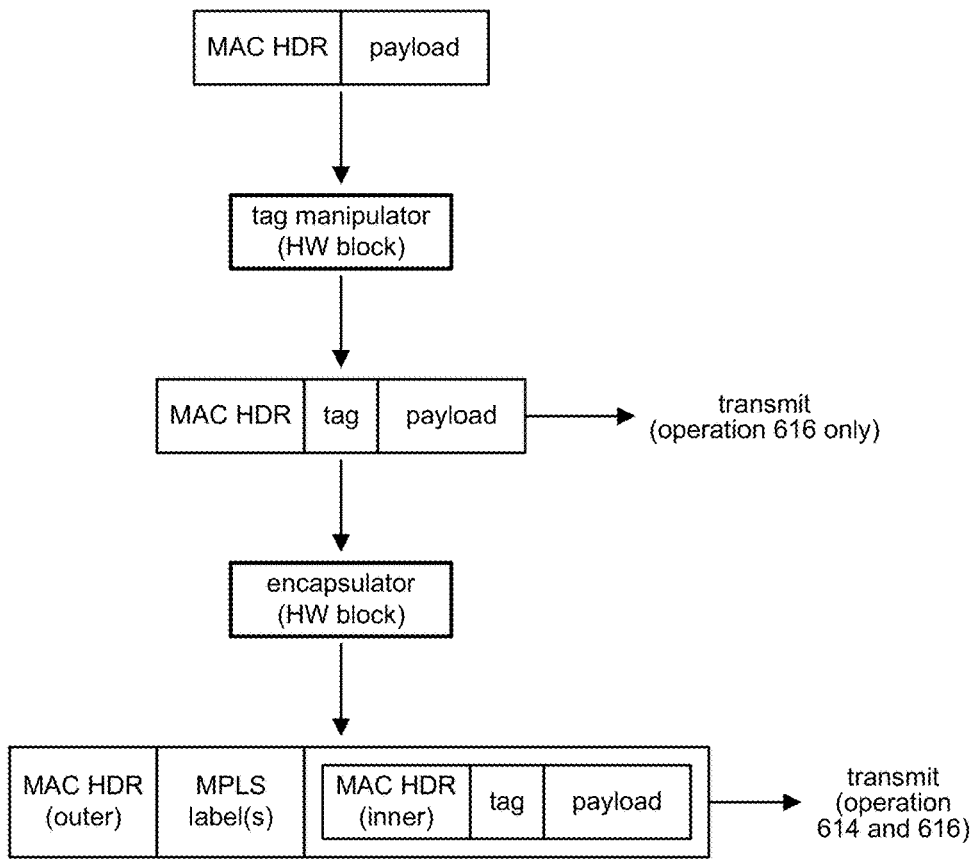
FIG. 6B shows an example of VID to bridged VLAN mapping.
FIG. 6C shows processing of a packet in accordance with the present disclosure.

Merely to illustrate, refer for a moment to FIG. 6B which shows some examples of port-based VID-to-bridged VLAN mappings (translations) that can be programmed or otherwise configured in PE 514-1 (FIG. 5). The example includes some mappings for port et11 on PE 514-1. A packet having a VID=10 that is received at port et11 will be mapped to (and bridged in) bridged VLAN 10. Similarly, a packet having a VID=50 that is received at port et11 will be mapped to bridged VLAN 30. Notably, the mapping is not based on the site (Site A or Site B) from which the packet was transmitted. For example, a packet from Site A (which is in bridged VLAN 10) that contains VID=10 will be bridged in the same bridge VLAN, namely bridged VLAN 10. On the other hand, a packet from Site A that contains VID=50 will be bridged in a different bridged VLAN, namely bridged VLAN 30. Of further note is that the VLAN in a VID is not related to the VLAN in a bridged VLANs.

At operation 606, the ingress pipeline can identify an appropriate egress pipeline. In some embodiments, for example, the egress pipeline can be identified based on the ingress traffic stream ID 712 which identifies where the ingress packet came in on. As noted above, the logic circuitry of ingress pipelines can be separate from the logic circuitry of egress pipelines, and in some embodiments can be on separate IC chips (ingress chips, egress chips). A global egress DB 704 can contain information about the egress pipelines, including on which egress chips the egress pipelines are located; this database is "global" in that the information in it is available to every ingress pipeline in the network device. The ingress traffic stream ID 712 can be used to perform a lookup on the global egress DB to identify an appropriate egress identifier 714. The egress identifier can include information that identifies the egress pipeline and the corresponding egress port, and the egress chip that contains the egress pipeline, which may or may not be the same chip as the ingress pipeline. The intermediate packet can be queued onto the identified egress pipeline for egress processing. Continuing with FIG. 6A, processing of the intermediate packet can continue in the identified egress pipeline as follows.

At operation 608, the egress pipeline can use the intermediate packet and metadata from the ingress pipeline (e.g., FIG. 4B) to identify editing directives in the egress data tables (e.g., 414) associated with the egress pipeline. The editing directives can direct the egress processing engine to produce an egress packet by further editing the intermediate packet. Referring again to FIG. 7, the egress data tables can include a local egress editing DB 706. The egress identifier 714 can be used to access appropriate editing directives from the local egress editing DB. The directives, for example, can include an EVPN tunnel encapsulation entry 716 to encapsulate the intermediate packet.

At operation 610, the egress pipeline can perform tag manipulation on the intermediate packet. As can be seen in FIG. 6C, this operation can be performed by a tag manipulator logic circuit in the egress pipeline. Tag manipulation is known and includes editing actions such as adding VLAN tags, deleting VLAN tags, changing VLAN tags, changing between single-tagged and double-tagged formats, and so on. Tag formats are known, such as Dot1Q, Dot1ad, QinQ, etc. In accordance with the present disclosure, the tag manipulations can be stored in a tag manipulation DB 708 in the egress pipeline. The EVPN tunnel encapsulation entry 716 can be used to determine an appropriate tag manipulation based on certain features to apply, such as EVPN MPLS, EVPN VxLAN, VPLS, etc. In some embodiments, for example, a feature ID 716*a* contained in the EVPN tunnel encapsulation entry 716 and the bridge ID (contained in the metadata from the ingress pipeline) that identifies the bridged VLAN can be used as lookup criteria to select a suitable tag manipulation directive 718 from the tag manipulation DB 708. The feature ID 716*a* informs the kind of tag manipulation to perform and the bridge ID provides the information (e.g., VID) for the manipulated tag.

To illustrate some examples of tag manipulation, suppose PE 514-1 in FIG. 5 is configured according to the VID-to-bridged VLAN mapping shown in FIG. 6B. Consider the following use cases:

Use Case 1
  Host A transmits a packet tagged with (ingress) VID=10
  ingress port on PE 514-1: port et11
  bridge domain: bridged VLAN 10
  bridge ID=bridged VLAN 10
  egress port: port et14
  Host A's packet (as payload): Dot1Q tagged with (egress) VID=10

Use Case 1 illustrates an example of a packet sent by Host A, where Host A (in bridged VLAN 10) transmits a packet with VID=10. The packet will ingress PE 514-1 on port et11. The mapping in FIG. 6B will map the ingress VID to bridged VLAN 10, per mapping entry 1, and the bridge ID will be set to a suitable identifier. The egress port (et14 in this case) is based on destination information in the ingress packet. A tag manipulation directive can then be selected based on feature(s) associated with the egress port and the bridge ID (bridged VLAN 10 in this case), and used to edit (manipulate) the tag in Host A's packet for egress. It will be understood that in the example shown above, the Dot1Q tagging of the Host A packet with egress VID=10 is strictly illustrative. The specific kind of tagging can include any kind of known tagging such as Dot1Q, Dot1ad, QinQ, etc., and the egress VID can be any suitable value. In other words, the specific tag manipulation will depend on how a given deployment is configured. To complete the discussion of this use case, the egress Host A packet will be encapsulated in an MPLS packet (discussed below) and so the tag manipulation can be referred to as payload tag manipulation. The encapsulated packet will egress on port et14 of PE 514-1.

Use Case 2
  Host C transmits a packet tagged with (ingress) VID=100
  ingress port on PE 514-1: port et12
  bridge domain: bridged VLAN 10
  bridge ID=bridged VLAN 10
  Host C's packet (as payload): Dot1Q tagged with (egress) VID=10
  egress port: port et14

Use Case 2 illustrates an example of a packet sent by Host C, where Host C (in bridged VLAN 10) transmits a packet with VID=100. The packet will ingress PE 514-1 on port et12. The mapping in FIG. 6B will map the ingress VID to bridged VLAN 10, per mapping entry 3, and the bridge ID will be set to a suitable identifier. The egress port (et14 in this case) is based on destination information in the ingress packet. A tag manipulation directive can then be selected based on feature(s) associated with the egress port and the bridge ID (bridged VLAN 10 in this case), and used to edit (manipulate) the tag in Host C's packet for egress. For Use Case 2, payload tag manipulation of the tag in the Host C packet results in the VID being changed from VID=100 to VID=10. However, as noted above in connection with Use Case 1, the Dot1Q tagging of the Host C packet is strictly illustrative. The specific tag manipulation performed on the Host C packet will depend on how a given deployment is configured. To complete the discussion of this use case, the egress Host C packet will be encapsulated in an MPLS packet (discussed below) and so the tag manipulation can be referred to as payload tag manipulation.

As can be seen from the foregoing use cases, tag manipulation in accordance with the present disclosure is based on the egress tunnel (e.g., determined based on features and bridge ID), rather than on the ingress port. As such, tag manipulation of packets that ingress on a given port can vary from one packet to the next depending on their destination at egress. Tag manipulation in accordance with the present disclosure is not tied to the ingress port.

At decision 612, if an MPLS encapsulation is required, then processing can continue at 614. For example, if the egress port connects to an MPLS core, then MPLS encapsulation can be performed. Otherwise, processing can continue at operation 616.

At operation 614, the egress pipeline can perform a lookup to identify an MPLS label. The tag-manipulated intermediate packet can be encapsulated in an MPLS packet (e.g., 202, FIG. 2A) with the MPLS label. As can be seen in FIG. 6C, this operation can be performed by an encapsulator logic circuit in the egress pipeline.

At operation 616, the egress pipeline can transmit the egress packet with or without MPLS encapsulation as illustrated in FIG. 6C. Processing of the received packet can be deemed complete.

ESI Label Push Per Subinterface

Figure 8:
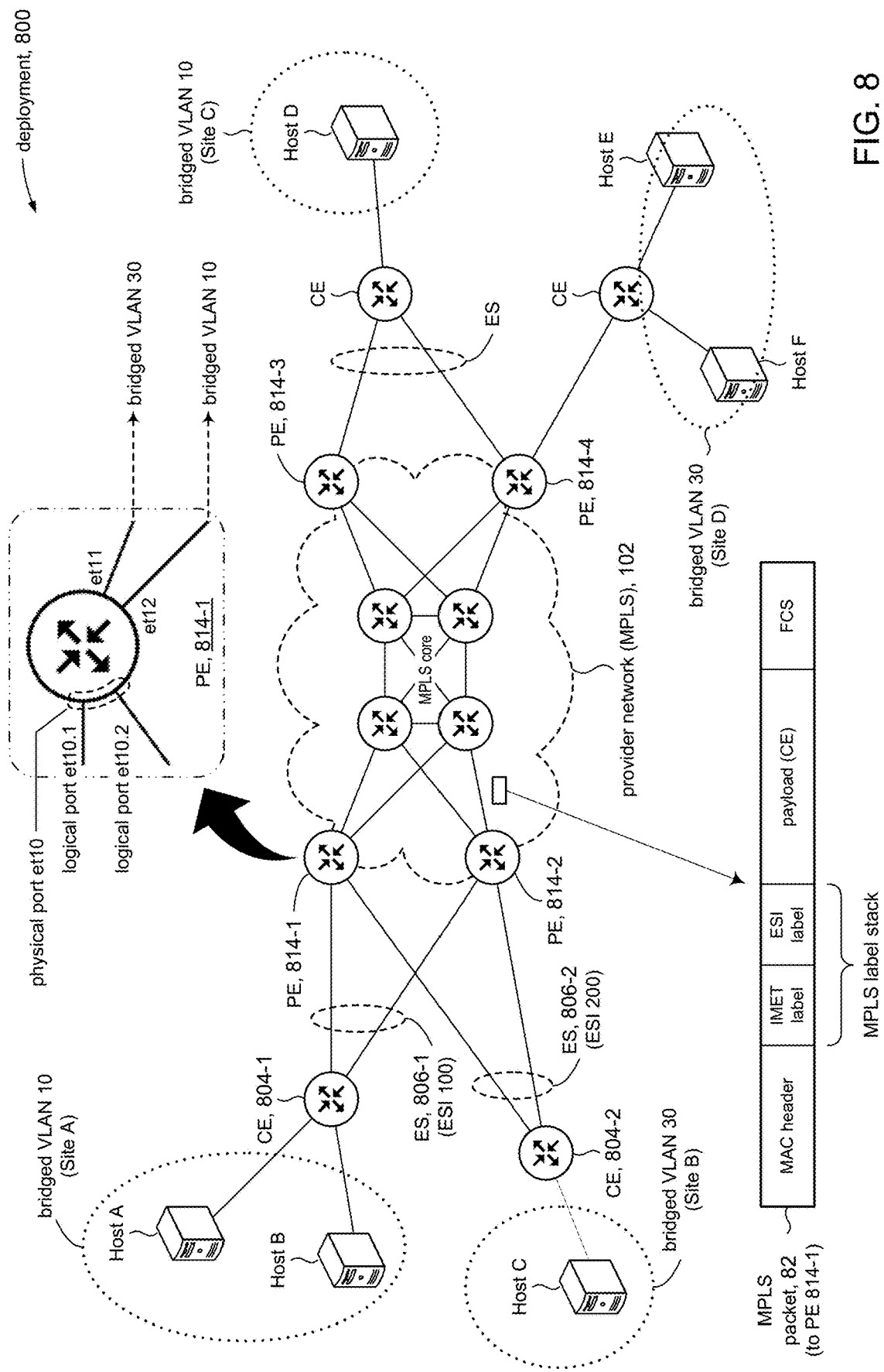
FIG. 8 shows an EVPN MPLS deployment to illustrate MPLS label pushing in accordance with the present disclosure.

FIG. 8 shows details in an EVPN MPLS deployed system 800 to illustrate an example of ESI label pushes in accordance with some embodiments, and in particular ESI label pushes based on subinterfaces. Deployment 800 comprises provider network 102 (FIG. 1) and CEs 804, which in this example are configured for multihoming. Host A and Host B are connected to CE 804-1. CE-804-1, in turn, is multihomed to PE 814-1 and PE 814-2. The two links from CE 804-1 to PE 814-1 and PE 814-2 can be referred to as an Ethernet segment (ES), and is identified in the figure as ESI 100. The figure shows Host C connected to CE 804-2. CE 804-2 is multihomed to PE 814-1 and PE 814-2 on ESI 200.

Deployment 800 is configured with two bridge domains. A bridge domain identified as bridged VLAN 10 that comprises two sites: Site A comprising Host A and Host B and Site C comprising Host D. A second bridge domain identified as bridged VLAN 30 comprises two sites: Site B comprising Host C and Site D comprising Host E and Host F.

PE 814-1 includes a physical port et10 that is configured as two subinterfaces et10.1 and et10.2. The figure shows that CE 804-1 and CE 804-2 are connected to PE 814-1 respectively on subinterfaces et10.1 and et10.2. Subinterface techniques are known and understood. Briefly, a physical port can be logically divided into two or more interfaces, referred to as subinterfaces, logical interfaces, etc. A subinterface defined on a physical port provides data transport independently of other subinterfaces defined on that physical port.

When a multihomed CE (e.g., 804-1) transmits a BUM packet to one of its PEs (e.g., 814-2), the PE will replicate the BUM packet to other (destination) PEs. The replicated packet that is destined for the other PE to which CE 804-1 is multihomed, namely PE 814-1, will include information that identifies the CE's Ethernet segment, namely ES 100. The Ethernet segment identifier serves to inform PE 814-1 that the original BUM packet was received on ES 100 so that the PE will know to not forward the received replicated BUM packet back CE 804-1, thus avoiding a flood loop. Accordingly, an Ethernet segment identifier (ESI) label that identifies Ethernet segment ES 100 must be pushed onto the MPLS stack of the MPLS packet that targets PE 814-1. MPLS packet 82 shown in FIG. 8 represents the packet destined for PE 814-1 and includes an ESI label that identifies ES 100.

In general, an ESI label is selected according to (1) the Ethernet segment on which the receiving PE received the BUM packet and (2) the destination PE of the replication packet. In the example shown in FIG. 8, for instance, if PE 814-2 receives a BUM packet on ES 100 (e.g., from CE 804-1), then the replicated packet destined for PE 814-1 will have an ESI label that identifies Ethernet segment ESI 100. Likewise, if PE 814-2 receives a packet on ES 200 (e.g., from CE 804-2), then the replicated packet destined for PE 814-1 will have an ESI label that identifies ESI 200. When the packet arrives at PE 814-1, the ESI label will inform PE 814-1 which Ethernet segment to avoid transmitting the packet on.

Figure 9A:
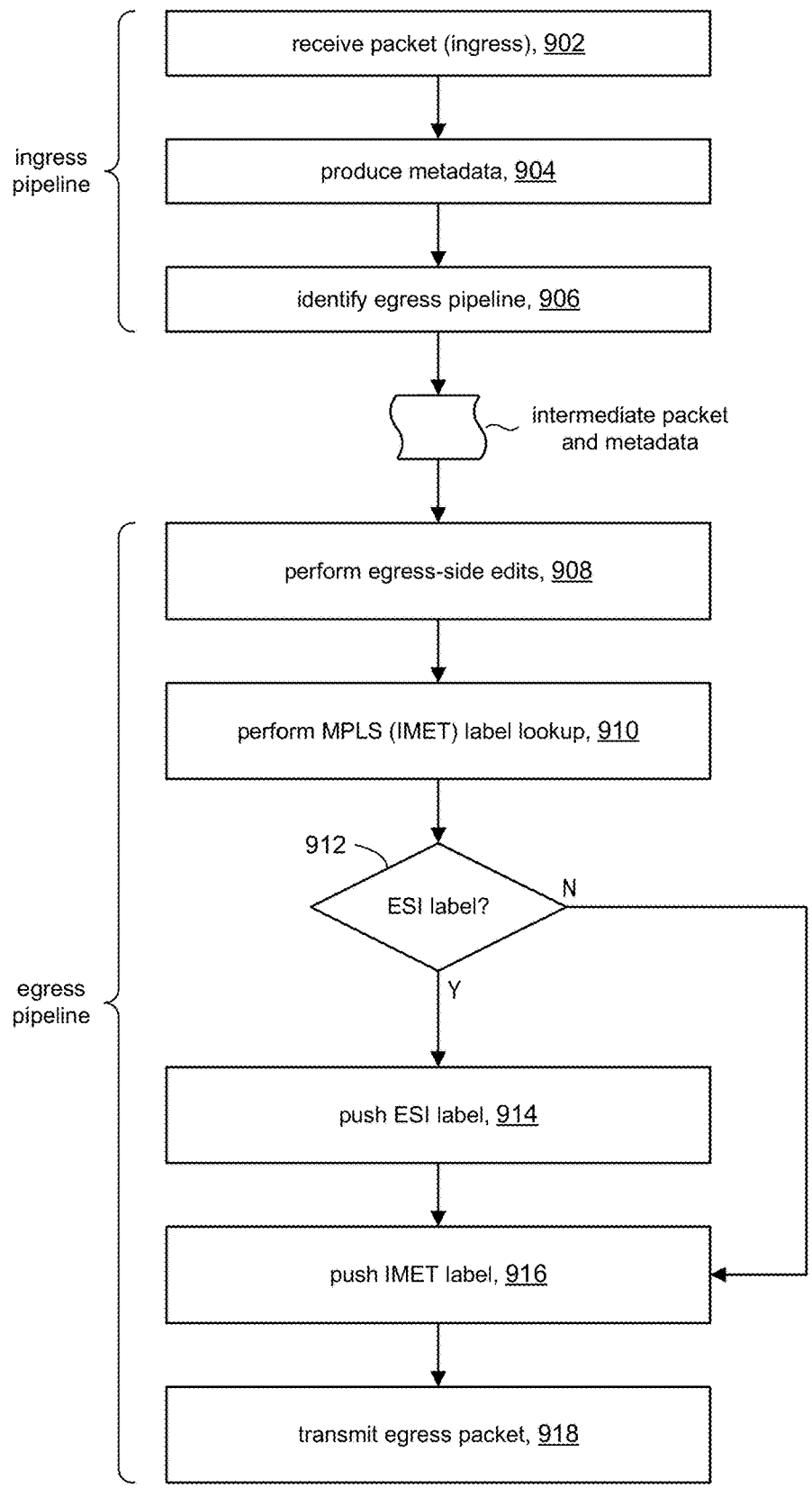
FIG. 9A is a high level flow of MPLS label pushing in accordance with the present disclosure.

Referring to FIG. 9A, the discussion will now turn to a high-level description of processing in a network device (e.g., PE 814-1, FIG. 8) for selecting ESI labels for MPLS packets in accordance with the present disclosure. In some embodiments, for example, the network device can include one or more digital processing units, which when operated, can cause the network device to perform processing in accordance with FIG. 9A. Digital processing units can include specialized processors in the data plane such as digital signal processors, field programmable arrays, application specific integrated circuits, and the like that operate by way of executing computer program code or by way of logic circuits being configured for specific operations. For example, packet forwarding logic 312 (FIG. 3) in the data plane can be a specialized processor.

At operation 902, the network device can receive a BUM packet (the ingress packet) at one of its ports. The ingress packet can be provided to the ingress pipeline associated with that port.

Figure 10:
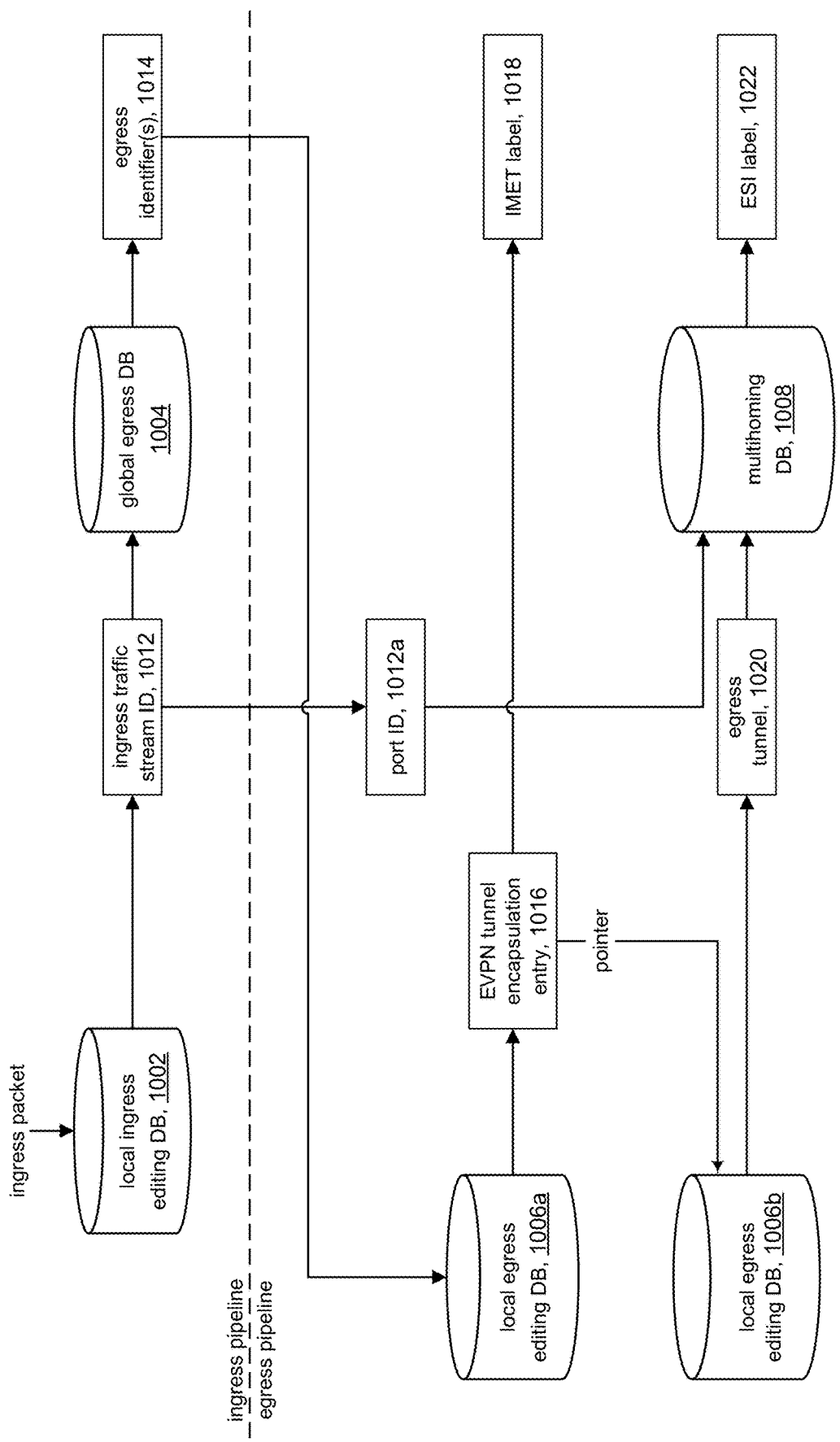
FIG. 10 shows ingress and egress data tables to support MPLS label pushing in accordance with the present disclosure.

At operation 904, processing in the ingress pipeline can produce metadata for further downstream processing. The ingress pipeline outputs the ingress packet as an intermediate packet, which as noted above may or may not include edits to the ingress packet. The ingress data tables (e.g., 412, FIG. 4B) associated with the ingress pipeline can be used to identify editing directives and other metadata using information contained in the ingress packet as lookup keys. FIG. 10 shows ingress and egress data tables similar to the tables shown in FIG. 7. Information in the ingress packet can be used to identify editing directives and metadata in local ingress editing DB 1002. The metadata can include an ingress traffic stream identifier (ID) 1012 that identifies the traffic stream of the ingress packet and, as shown below, the ingress traffic stream ID can be used to identify an egress pipeline.

Figures 9B, 9C:
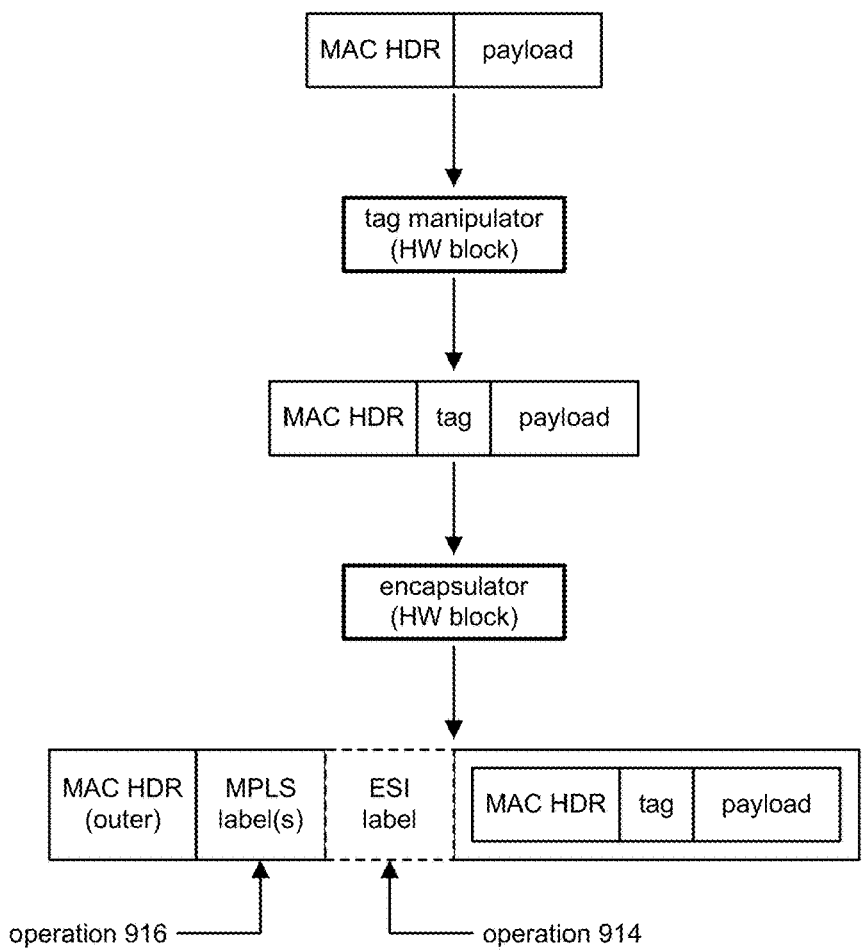
FIG. 9B shows an example of VID to bridged VLAN mapping.
FIG. 9C shows processing of a packet in accordance with the present disclosure.

The metadata can further include information that identifies the bridged VLAN in which to bridge the ingress packet. In some embodiments, for example, the bridged VLAN is determined based on the VID contained in the ingress packet; the VID can be mapped (translated) to a bridged VLAN. The mapping between VID and bridged VLAN is configured in the PE device on a port by port basis, and more particularly on a subinterface by subinterface basis. For example, referring to the illustrative deployment in FIG. 8, port et10 on PE 814-1 can be configured to map a packet that arrives on subinterface et10.1 and contains a VID=100 to bridged VLAN 10. If Host A sends a packet with VID=100, then the packet will remain in bridge VLAN 10 by operation of the configured mapping. FIG. 9B shows additional examples of subinterface-based VID-to-bridged VLAN mappings that can be programmed or otherwise configured in PE 814-1.

At operation 906, the ingress pipeline can identify one or more egress pipelines on which to forward the BUM packet. In some embodiments, for example, the egress pipeline can be identified based on the ingress traffic stream ID 1012 which identifies where the ingress packet came in on. As noted above, logic circuitry of ingress pipelines can be separate from logic circuitry of egress pipelines, and in some embodiments can be on separate IC chips (egress chips). A global egress DB 1004 can contain information about the egress pipelines, including on which egress chips the egress pipelines are located. The ingress traffic stream ID 1012 can be used to perform a lookup on the global egress DB to identify appropriate egress identifiers 1014. The egress identifier can include information that identifies the egress pipeline and the corresponding egress port, and the egress chip that contains the egress pipeline, which may or may not be the same chip as the ingress pipeline. The intermediate packet can be replicated and queued onto each identified egress pipeline. Continuing with FIG. 9A, processing of the intermediate packet can continue in each of the identified egress pipelines as follows.

At operation 908, the egress pipeline can use the intermediate packet and metadata from the ingress pipeline to identify editing directives in the egress data tables associated with the egress pipeline. As can be seen in FIG. 9C, this operation can be performed by a tag manipulator logic circuit in the egress pipeline. The editing directives can direct the egress processing engine to produce an egress packet by further editing the intermediate packet. Referring again to FIG. 10, the egress identifier 1014 can be used to access appropriate editing directives from local egress editing DB 1006a. As described above, for example, the directives can include an EVPN tunnel encapsulation entry 1016 to encapsulate the intermediate packet.

At operation 910, the egress pipeline can determine the EVPN tunnel and an IMET (Inclusive Multicast Ethernet Tag) label. Referring to FIG. 10 for example, the EVPN tunnel encapsulation entry 1016 can include information that identifies an IMET (Inclusive Multicast Ethernet Tag) label 1018. As explained below, the IMET label will be pushed onto the MPLS label stack of the MPLS packet.

At decision 912, if an ESI label is available, then processing can continue at 914. If an ESI label is not available, then processing can continue at 916. As explained above, an ESI label is pushed onto the MPLS stack according to (1) the Ethernet segment on which the packet ingressed and (2) the destination PE. Referring to FIG. 10, in accordance with some embodiments, ingress editing directives 1012 can include information, e.g., port ID 1012a, that identifies the ingress port and hence the Ethernet segment. As shown in FIG. 8, for example, port et10.1 on PE 814-1 is connected to Ethernet segment 100, and port et10.2 is connected to Ethernet segment 200.

Further in accordance with some embodiments, an additional local egress editing DB 1006b contains egress tunnel identifiers. The EVPN tunnel encapsulation entry 1016 can include a pointer to an entry in the egress editing DB 1006b to obtain an egress tunnel identifier 1020 that identifies the tunnel on which the packet will be transmitted, including the destination PE.

In some embodiments, the egress data tables can include a multihoming DB 1008 that contains ESI labels to support multihomed configurations. The port ID 1012a (representing the Ethernet segment) and the egress tunnel identifier 1020 (representing the destination PE) can be used as lookup keys to perform a lookup in the multihoming DB. If the lookup produces an ESI label 1022, then the ESI label can be pushed onto the MPLS label stack (operation 914). Consider PE 814-2 in FIG. 8, for example. The multihoming DB in PE 814-2 will contain an entry that matches on port ID==et10.1 and egress tunnel identifier==PE 814-1 because both port et10.1 and PE 814-1 are connected to Ethernet segment ES 100; the entry will contain an ESI label that represents ES 100 for PE 814-1. On the other hand, the multihoming DB will not contain ESI label entries for PEs 814-3, 814-4 because neither PE is connected to ES 100.

In accordance with the present disclosure, port ID 1012a can identify physical-only ports or subinterfaces. In some instances, the ingress port that is identified by port ID 1012a can be a physical-only port, where the physical port is not configured as multiple subinterfaces. In other instances, the ingress port that is identified by port ID 1012a can be a subinterface. FIG. 8, for example, shows physical port et10 to be configured as subinterfaces (interfaces) et10.1, et10.2, so port ID 1012a will identify et10.1 or et10.2. Selection of the ESI label In accordance with the present disclosure is not tied to the ingress port being a physical port and can be based on ingress ports that are subinterfaces of a physical port.

At operation 914, the egress pipeline can push an ESI label onto the MPLS label stack, if the lookup in multihoming DB 1008 resulted in an ESI label (decision point 912). As can be seen in FIG. 9C, this operation can be performed by an encapsulator logic circuit in the egress pipeline.

At operation 916, the egress pipeline can push the IMET label (determined at operation 910) onto the MPLS label stack. If an ESI label is required, then the MPLS stack will have the ESI label pushed, followed by a push of the IMET label. If an ESI label is not required, then the MPLS stack will have only a push of the IMET label.

At operation 918, the egress pipeline can transmit the egress packet. Processing of the replicated BUM packet can be deemed complete. It will be understood that the foregoing egress pipeline operations are applied to each replicated BUM packet.

Tag Manipulation and ESI Label Push

Figure 11:
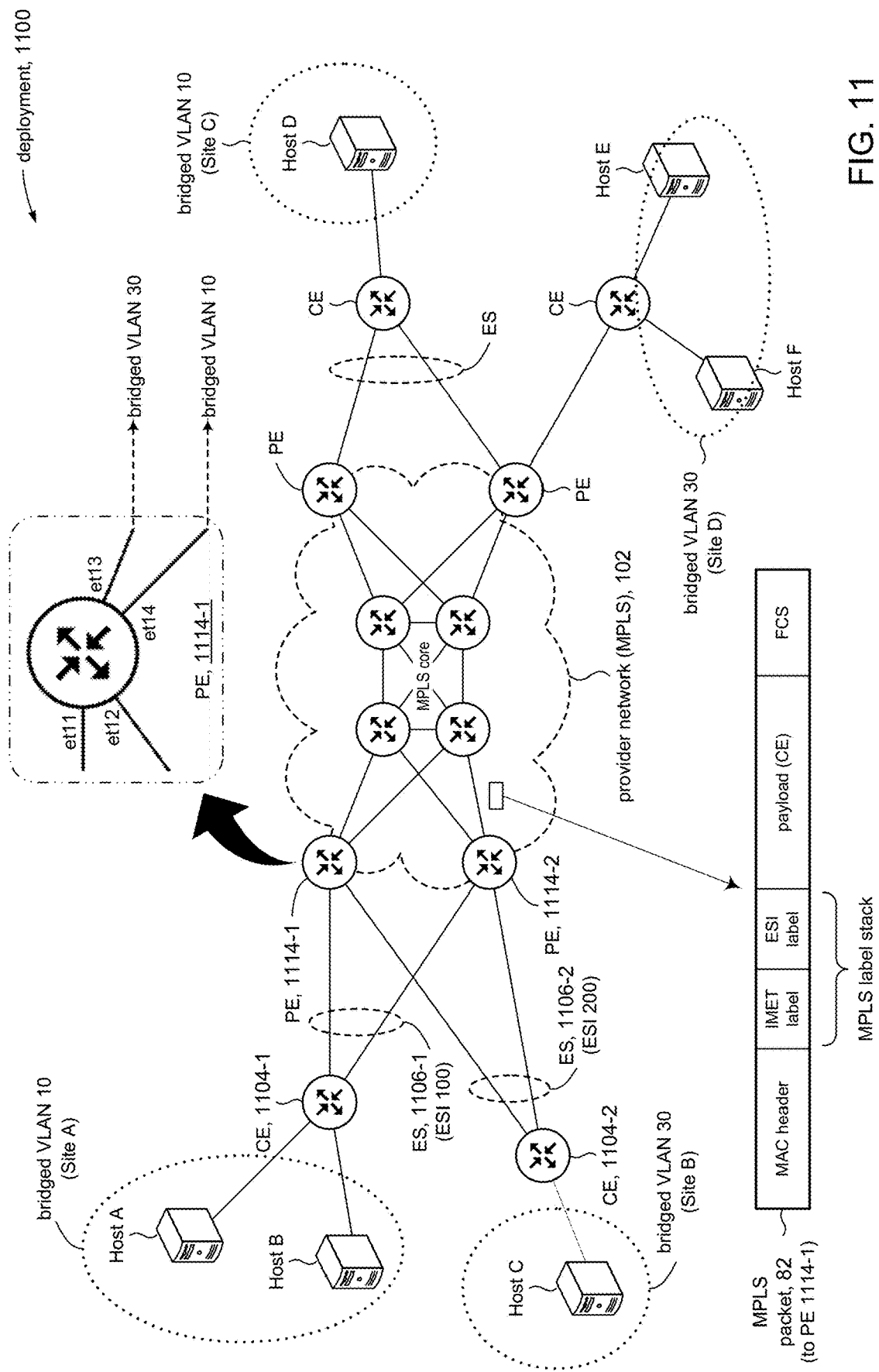
FIG. 11 shows an EVPN MPLS deployment to illustrate tag manipulation and MPLS label pushing in accordance with the present disclosure.

FIG. 11 shows details in an EVPN MPLS deployed system 1100 to illustrate an example of tag manipulation in conjunction with ESI label pushes, in accordance with some embodiments. Deployment 1100 is based on the deployments shown in FIGS. 5 and 8. Deployment 1100 comprises provider network 102 (FIG. 1) and CEs 1104, which in this example are configured for multihoming. Host A and Host B are connected to CE 1104-1. CE 1104-1, in turn, is multihomed to PE 1114-1 and PE 1114-2. The two links from CE 1104-1 to PE 1114-1 and PE 1114-2 can be referred to as an Ethernet segment (ES), and is identified in the figure as ESI 100. The figure shows Host C connected to CE 1104-2. CE 1104-2 is multihomed to PE 1114-1 and PE 1114-2 on ESI 200.

Deployment 1100 is configured with two bridge domains. A bridge domain identified as bridged VLAN 10 that comprises two sites: Site A comprising Host A and Host B and Site C comprising Host D. A second bridge domain identified as bridged VLAN 30 comprises two sites: Site B comprising Host C and Site D comprising Host E and Host F.

PE 1114-1 includes physical ports et11 and et12, although it will be appreciated that in other embodiments, PE 1114-1 can be configured with subinterfaces such as shown in FIG. 8 for instance. FIG. 11 shows that CE 1104-1 and CE 1104-2 are connected to PE 1114-1 on respectively ports et11 and et12. When a multihomed CE (e.g., 1104-1) transmits a BUM packet to one of its PEs (e.g., 1114-2), the PE will replicate the BUM packet to the other PEs. As explained above in connection with FIG. 8, the replicated packet that is sent to the other PE (PE 1114-1) to which CE 1104-1 is multihomed will include information that identifies the CE's Ethernet segment, in this case ES 100. The Ethernet segment identifier informs PE 1114-1 to not forward the replicated BUM packet back to CE 1104-1 so as to avoid creating a flood loop.

In general, an ESI label is selected according to the Ethernet segment on which the receiving PE received the BUM packet and the destination PE of the replication packet. In the example in FIG. 11, if PE 1114-2 receives a BUM packet on ES 100 (e.g., from CE 1104-1), then the replicated packet destined for PE 1114-1 will have an ESI label that identifies Ethernet segment ESI 100. Likewise, if PE 1114-2 receives a packet on ES 200 (e.g., from CE 1104-2), then the replicated packet destined for PE 1114-1 will have an ESI label that identifies ESI 200. When the replicated packet arrives at PE 1114-1, the ESI label will inform the PE which Ethernet segment to avoid transmitting the packet on; e.g., if the ESI label identifies ES 100, then the PE will not forward the replicated packet on ES 100 and likewise if the ESI label identifies ES 200, then the PE will not forward the replicated packet on ES 200.

Figure 12:
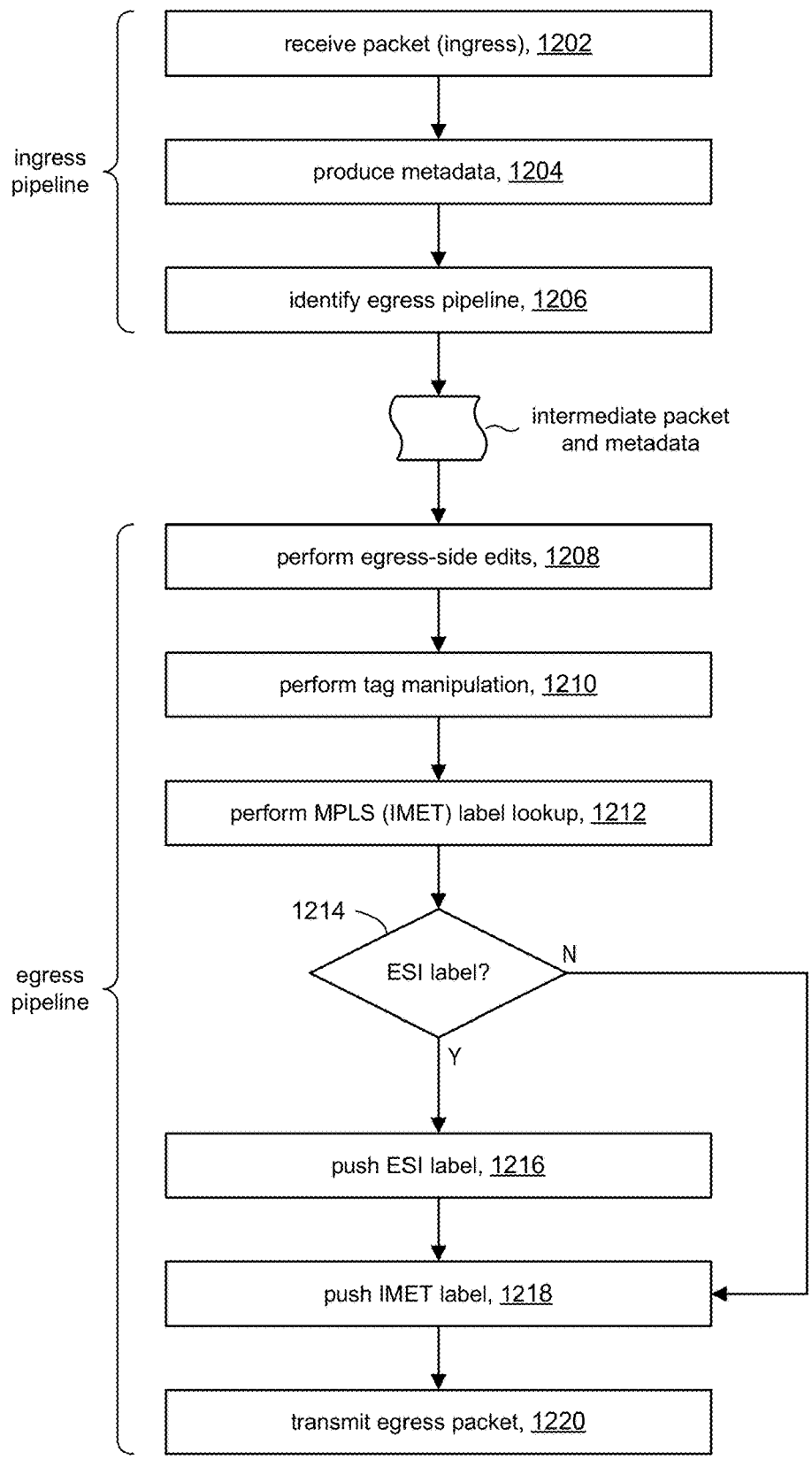
FIG. 12 is a high level flow of tag manipulation and MPLS label pushing in accordance with the present disclosure.

Referring to FIG. 12, the discussion will now turn to a high-level description of processing in a network device (e.g., PE 1114-1, FIG. 11) for tag manipulation and ESI label selection in accordance with the present disclosure. In some embodiments, for example, the network device can include one or more digital processing units, which when operated, can cause the network device to perform processing in accordance with FIG. 12. Digital processing units can include specialized processors in the data plane such as digital signal processors, field programmable arrays, application specific integrated circuits, and the like that operate by way of executing computer program code or by way of logic circuits being configured for specific operations. For example, packet forwarding logic 312 (FIG. 3) in the data plane can be a specialized processor.

At operation 1202, the network device can receive a BUM packet (the ingress packet) at one of its ports. The ingress packet can be provided to the ingress pipeline associated with that port.

At operation 1204, processing in the ingress pipeline can produce metadata for further downstream processing. The ingress pipeline outputs the ingress packet as an intermediate packet, which as noted above may or may not include edits to the ingress packet. The ingress data tables (e.g., 412, FIG. 4B) associated with the ingress pipeline can be used to identify editing directives and other metadata using information contained in the ingress packet as lookup keys. Referring for a moment to the data tables in FIG. 13, the figure shows examples of ingress and egress editing tables such as those shown in FIGS. 7 and 10. The ingress data tables can include a local ingress editing database (DB) 1302. Information in the ingress packet can be used to identify editing directives and metadata in local ingress editing DB 1302. The metadata can include an ingress traffic stream identifier (ID) 1312 that identifies the traffic stream of the ingress packet and, as shown below, the ingress traffic stream ID can be used in the egress pipeline.

As explained above, the metadata can further include information that identifies the bridged VLAN in which to bridge the ingress packet. In some embodiments, for example, the bridged VLAN is determined based on the VID contained in the ingress packet; the VID can be mapped (translated) to a bridged VLAN. The mapping between VID and bridged VLAN is configured in the PE device on a port by port basis, in some embodiments, and in other embodiments, on a subinterface by subinterface basis.

At operation 1206, the ingress pipeline can identify one or more egress pipelines on which to forward the BUM packet. In some embodiments, for example, the egress pipeline can be identified based on the ingress traffic stream ID 1312 which identifies where the ingress packet came in on. As noted above, logic circuitry of ingress pipelines can be separate from logic circuitry of egress pipelines, and in some embodiments can be on separate IC chips (egress chips). A global egress DB 1304 can contain information about the egress pipelines, including on which egress chips the egress pipelines are located. The ingress traffic stream ID 1312 can be used to perform a lookup on the global egress DB to identify appropriate egress identifiers 1314. The egress identifier can include information that identifies the egress pipeline and the corresponding egress port, and the egress chip that contains the egress pipeline, which may or may not be the same chip as the ingress pipeline. The intermediate packet can be replicated and queued onto each identified egress pipeline. Continuing with FIG. 12, processing of the intermediate packet can continue in each of the identified egress pipelines as follows.

At operation 1208, the egress pipeline can use the intermediate packet and metadata from the ingress pipeline to identify editing directives in the egress data tables associated with the egress pipeline. The editing directives can direct the egress processing engine to produce an egress packet by further editing the intermediate packet. Referring again to FIG. 13, the egress data tables can include a local egress editing DB 1306a. The egress identifier 1314 can be used to access appropriate editing directives from the local egress editing DB. The directives, for example, can include an EVPN tunnel encapsulation entry 1316 to encapsulate the intermediate packet in an MPLS packet for egress.

At operation 1210, the egress pipeline can perform tag manipulation. In some embodiments in accordance with the present disclosure, the editing directives can include information that identifies VLAN tag manipulation directives. As explained above, tag manipulation includes actions such as adding VLAN tags, deleting VLAN tags, changing VLAN tags, changing between single-VLAN and double-VLAN tagged formats, and so on.

Tag manipulation in accordance with the present disclosure can be customized based on the egress tunnel vis-à-vis the EVPN tunnel encapsulation directive. As such, tag manipulation packets that ingress on a given port can vary from one packet to the next depending on their destination at egress, and is not tied to the ingress port.

In accordance with the present disclosure, the tag manipulations can be stored in a tag manipulation DB 1308 in the egress pipeline. The EVPN tunnel encapsulation entry 1316 can be used to determine an appropriate tag manipulation based on certain feature to apply, such as EVPN MPLS, EVPN VxLAN, VPLS, etc. In some embodiments, for example, a feature ID 1316a contained in the EVPN tunnel encapsulation entry 1316 and the bridge ID (contained in the metadata from the ingress pipeline) that identifies the bridged VLAN can be used as lookup criteria to select a suitable tag manipulation directive 1318 from the tag manipulation DB 1308. The feature ID 1316a informs the kind of tag manipulation to perform and the bridge ID provides the information (e.g., VID) for the manipulated tag.

Figure 13:
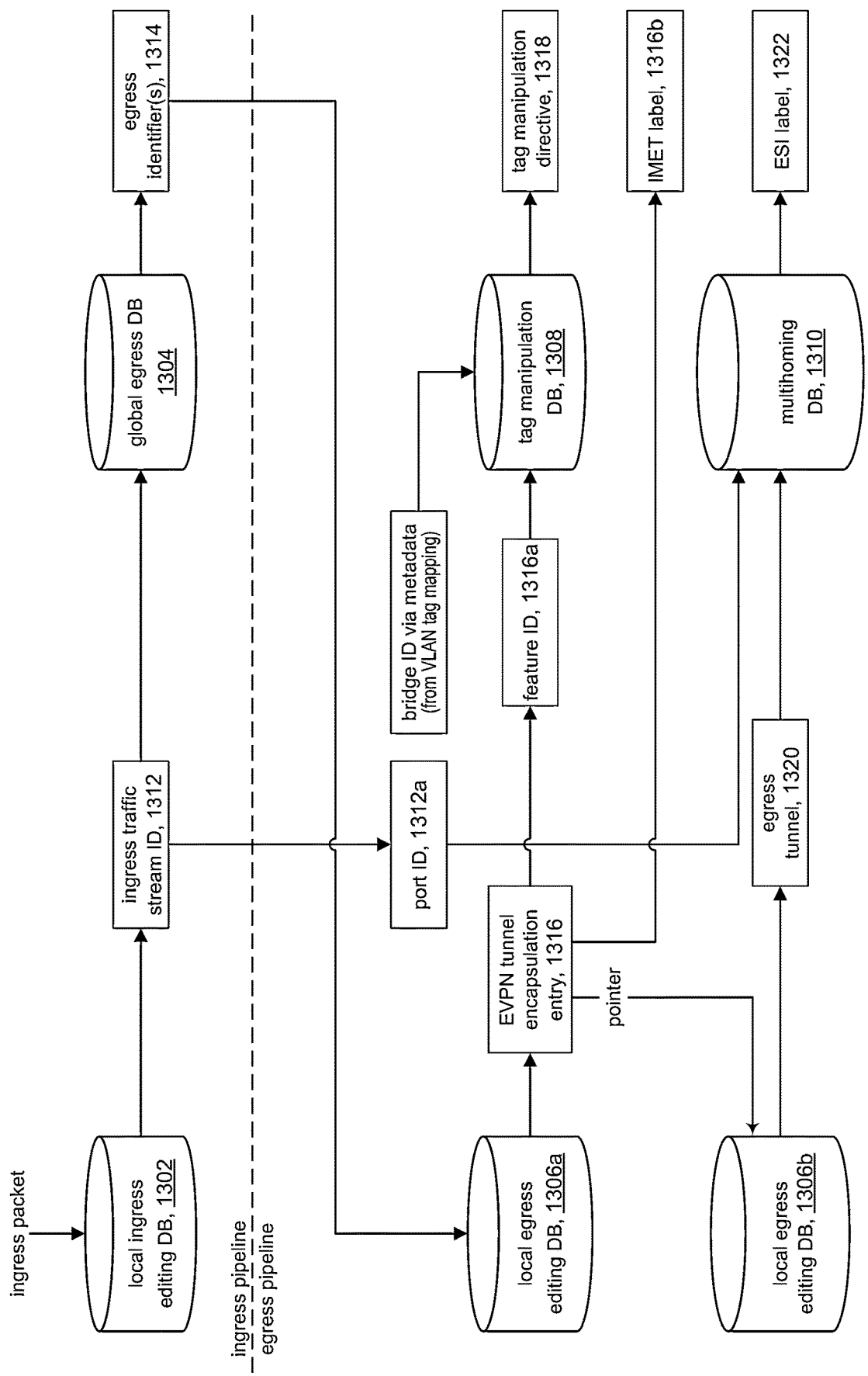
FIG. 13 shows ingress and egress data tables to support tag manipulation and MPLS label pushing in accordance with the present disclosure.

At operation 1212, the egress pipeline can determine the EVPN tunnel and an IMET label. Referring to FIG. 13 for example, the EVPN tunnel encapsulation entry 1316 can include information that identifies an IMET label 1316b. As explained below, the IMET label will be pushed onto the MPLS label stack of the MPLS packet.

At decision 1214, if an ESI label is available, then processing can continue at 1216. If an ESI label is not available, then processing can continue at 1218. As explained above, an ESI label is pushed onto the MPLS stack according to (1) the Ethernet segment on which the packet ingressed and (2) the destination PE. Referring to FIG. 13, in accordance with some embodiments, ingress editing directives 1312 can include information, e.g., port ID 1312a, that identifies the ingress port and hence the Ethernet segment. As shown in FIG. 11, for example, port et11 on PE 1114-1 is connected to Ethernet segment 100, and port et12 is connected to Ethernet segment 200.

Further in accordance with some embodiments, an additional local egress editing DB 1306b contains egress tunnel identifiers. The EVPN tunnel encapsulation entry 1316 can include a pointer to an entry in the egress editing DB 1306b to obtain an egress tunnel identifier 1320 that identifies the tunnel on which the packet will be transmitted, including the destination PE.

The egress data tables can include a multihoming DB 1310 that contains ESI labels to support multihomed configurations. The port ID 1312a (representing the Ethernet segment) and the egress tunnel identifier 1320 (representing the destination PE) can be used as lookup keys to perform a lookup in the multihoming DB. If the lookup produces an ESI label 1322, then that ESI label can be pushed onto the MPLS label stack (operation 1214).

At operation 1216, the egress pipeline can push an ESI label onto the MPLS label stack, if the lookup in multihoming DB 1308 resulted in an ESI label.

At operation 1218, the egress pipeline can push the IMET label (determined at operation 1212) onto the MPLS label stack. If an ESI label is required, then the MPLS stack will have the ESI label pushed, followed by a push of the IMET label. If an ESI label is not required, then the MPLS stack will have only a push of the IMET label.

At operation 1220, the egress pipeline can transmit the egress packet. Processing of the received BUM packet can be deemed complete.

Further Examples

In accordance with the present disclosure, a method in a network device includes receiving an ingress packet, the ingress packet containing a VLAN tag; producing an egress packet; and transmitting the egress packet on the egress port. Producing an egress packet includes performing first processing of the ingress packet in an ingress pipeline; performing second processing of the ingress packet, subsequent to the first processing, in an egress pipeline separate from the ingress pipeline, wherein the second processing includes identifying an egress port; and modifying the VLAN tag contained in the ingress packet to produce a modified VLAN tag for the egress packet, wherein modifying the VLAN tag is based at least on the egress port.

In some embodiments, the ingress pipeline is on a processing chip separate from a processing chip that contains the egress pipeline.

In some embodiments, the egress port is associated with a plurality of destination devices, wherein the second processing further includes identifying a destination device from among the plurality of destination devices, wherein modifying the VLAN tag contained in the ingress packet is further based on the identified destination device. In some embodiments, the network device and the plurality of destination devices are provider edge (PE) devices on an L2 EVPN MPLS network.

In some embodiments, modifying the VLAN tag contained in the ingress packet includes performing a table lookup on a data table in the egress pipeline.

In some embodiments, modifying the VLAN tag contained in the ingress packet includes one of: changing the VLAN tag from a single-tag format to a double-tag format; changing the VLAN tag from a double-tag format to a single-tag format; and changing the untagged packet to single-tag format.

In accordance with the present disclosure, a method in a network device includes receiving a packet, the received packet containing a virtual local area network (VLAN) tag; generating an egress packet from the received packet, including performing first processing of the received packet in an ingress pipeline, including identifying an egress port; performing second processing of the received packet, subsequent to the first processing, in an egress pipeline associated with the egress port and separate from the ingress pipeline; and modifying, in the egress pipeline, the VLAN tag contained in the received packet to produce a modified VLAN tag for the egress packet, wherein modifying the VLAN tag is based at least on the egress port; and transmitting the egress packet on the egress port.

In some embodiments, the ingress pipeline is on a processing chip separate from a processing chip that contains the egress pipeline.

In some embodiments, modifying the VLAN tag contained in the received packet includes performing a table lookup on a data table in the egress pipeline.

In some embodiments, the second processing further includes identifying a destination device from among a plurality of destination devices, wherein modifying the VLAN tag contained in the received packet is further based on the identified destination device. In some embodiments, the plurality of destination devices are provider edge (PE) devices on an L2 EVPN MPLS (Layer 2, Ethernet virtual private network, multi-protocol label switching) network.

In some embodiments, wherein modifying the VLAN tag contained in the received packet includes one of changing the VLAN tag from a single-tag format to a double-tag format; or changing the VLAN tag from a double-tag format to a single-tag format.

In some embodiments, modifying the VLAN tag is not performed when the ingress port and the egress port are connected to the same bridge domain.

In accordance with the present disclosure, a method in a network device includes receiving a packet on a first port of the network device; performing first processing of the received packet in an ingress pipeline, including identifying a second port; performing second processing of the received packet in an egress pipeline associated with the second port, the egress pipeline separate from the ingress pipeline, wherein the second processing includes a tag editing operation when the first port and the second port are connected to different bridge domains; and transmitting the egress packet on the second port.

In some embodiments, the second processing does not include the tag editing operation when the first port and the second port are connected to the same bridge domain.

In some embodiments, the second processing further includes identifying a destination device from among a plurality of destination devices, wherein the tag editing operation is based on the identified destination device. In some embodiments, the tag editing operation is further based on a feature identifier.

In some embodiments, the tag editing operation includes performing a table lookup on a data table in the egress pipeline.

In some embodiments, the ingress pipeline is on a processing chip separate from a processing chip that contains the egress pipeline.

In some embodiments, the tag editing operation includes adding a VLAN tag to the received packet; or changing a VLAN tag already contained in the received packet, including changing the VLAN tag from a single-tag format to a double-tag format or changing the VLAN tag from a double-tag format to a single-tag format.

In accordance with the present disclosure, a network device includes one or more computer processors; and a first port, the first port having ingress pipeline circuitry associated with the first port; and a second port different from the first port, the second port having egress pipeline circuitry associated with the second port, wherein a packet received on the first port is processed by the ingress pipeline circuitry to produce an intermediate packet, wherein the intermediate packet is subsequently processed in the egress pipeline circuitry, including performing tag manipulation of the intermediate packet and transmitting an egress packet on the second port.

In some embodiments, tag manipulation of the intermediate packet is performed when the first port and the second port are connected to different bridge domains.

In some embodiments, tag manipulation of the intermediate packet is not performed when the first port and the second port are connected to the same bridge domain.

In some embodiments, the egress pipeline circuitry includes egress data tables, wherein the tag manipulation includes performing a table lookup on the egress data tables.

In some embodiments, the ingress pipeline circuitry is on an integrated circuit (IC) chip different from an IC chip of the egress pipeline circuitry.

In some embodiments, the tag manipulation includes adding a VLAN tag to the received packet; or changing a VLAN tag already contained in the received packet, including changing the VLAN tag from a single-tag format to a double-tag format or changing the VLAN tag from a double-tag format to a single-tag format.

In some embodiments, the network device is a PE device on a L2 EVPN MPLS network.

In accordance with the present disclosure, a method in a network device on an L2 EVPN MPLS network includes (a) receiving an ingress packet on a (ingress) port that is associated with one or more Ethernet segments (ES's), wherein the ingress port is a physical port or a logical port; (b) determining from among the one or more ES's an (ingress) ES on which the ingress packet was received based on the ingress port; (c) selecting a destination device from among a plurality of destination devices; (d) pushing a second MPLS label on the egress packet when the selected destination device is associated with the ingress ES, the second MPLS label based on the ingress ES and selected destination device; (e) pushing a first MPLS label on an egress packet, the first MPLS label based on the selected destination device; and (f) transmitting the egress packet to the determined destination.

In some embodiments, the ingress port is a logical port among a plurality of logical ports defined on a physical port of the network device.

In some embodiments, the ingress port is a physical port of the network device.

In some embodiments, the method further includes using the ingress ES and the selected destination device to access the second MPLS label from a database.

In some embodiments, the ingress packet is a flood packet, the method further comprising repeating (c) to (f) for each destination device in the plurality of destination devices.

In some embodiments, the network device and the plurality of destination devices are provider edge (PE) devices on the L2 EVPN MPLS network.

In accordance with the present disclosure, a method in a network device on an L2 EVPN MPLS network includes receiving an ingress packet; performing first processing of the ingress packet in an ingress pipeline; performing second processing of the ingress packet subsequent to the first processing in an egress pipeline separate from the ingress pipeline; and transmitting the egress packet to the MPLS network. The second processing includes modifying a VLAN tag contained in the ingress packet to produce a modified VLAN tag for an egress packet and pushing an Ethernet segment identifier label onto the egress packet.

In some embodiments, the network device is associated with a plurality of Ethernet segments (ES's), wherein the ingress packet is received on a (ingress) ES among the plurality of ES's, the method further comprising pushing an additional MPLS label on the egress packet when the selected destination device is associated with the ingress ES, wherein the additional MPLS label is a label that identifies the ingress ES.

In some embodiments, the ingress packet is a flood packet, the method further comprising repeating the modifying, pushing, and transmitting for each destination device in the plurality of destination devices. In some embodiments, the network device and the plurality of destination devices are provider edge (PE) devices on the L2 EVPN MPLS network.

In some embodiments, modifying the VLAN tag is based at least on an egress port on which to transmit the egress packet. In some embodiments, the tag editing operation is further based on a feature identifier In some embodiments, the ingress pipeline is on a processing chip separate from a processing chip that contains the egress pipeline.

In accordance with the present disclosure, a network device on an Ethernet virtual private network (EVPN) Layer 2 (L2) multi-protocol label switching (MPLS) network, including receiving an ingress packet; performing first processing in response to receiving the ingress packet in an ingress pipeline; and performing second processing on the ingress packet in an egress pipeline separate from the ingress pipeline, the second processing including: modifying a virtual local area network (VLAN) tag contained in the ingress packet to produce a modified VLAN tag for an egress packet; pushing at least one MPLS label onto the egress packet; and transmitting the egress packet to a destination device on the MPLS network.

In some embodiments, the method further includes encapsulating the ingress packet as a payload in the egress packet, wherein the encapsulated ingress packet contains the modified VLAN tag as a payload VLAN tag.

In some embodiments, the EVPN L2 MPLS network includes a plurality of Ethernet segments (ES's), wherein the ingress packet is received on one of the plurality of ES's (ingress ES), wherein the at least one MPLS label is an identifier of the ingress ES when the destination device is connected to an ES that is the same as the ingress ES.

In some embodiments, the ingress packet is a flood packet, the method further comprising identifying a plurality of destination devices and repeating the modifying, pushing, and transmitting for each destination device in the plurality of destination devices. In some embodiments, the network device and the plurality of destination devices are provider edge (PE) devices on the EVPN L2 MPLS network.

In some embodiments, the first processing in the ingress pipeline produces metadata that is used for the second processing in the egress pipeline.

In some embodiments, modifying the VLAN tag is based at least on an egress port on an egress port on which the egress packet is to be transmitted, and on a feature associated with the egress port.

In some embodiments, the ingress pipeline is on a processing chip separate from a processing chip that contains the egress pipeline.

In accordance with the present disclosure, a network device on an MPLS network includes one or more computer processors; a first port, the first port having ingress pipeline circuitry associated with the first port; and a second port different from the first port, the second port having egress pipeline circuitry, separate from the ingress pipeline, associated with the second port. An ingress packet received on the first port is processed by the ingress pipeline circuitry to produce metadata. The ingress packet is processed by the egress pipeline circuitry using the metadata to produce an egress packet, the egress packet including a modified VLAN tag generated by modifying a VLAN tag in the ingress packet; and at least one MPLS label determined based on the first port; and wherein the egress pipeline circuitry transmits the egress packet to the MPLS network to a destination device.

In some embodiments, the ingress pipeline circuitry is on an integrated circuit (IC) chip different from an IC chip of the egress pipeline circuitry.

In some embodiments, the first port is associated with an Ethernet segment (ES) and the destination device to which the egress packet is transmitted is connected to the same ES as the first port, wherein the at least one MPLS label is an identifier that identifies the ES.

In some embodiments, when the ingress packet is a flood packet, the method further comprises identifying a plurality of destination devices and repeating the modifying, pushing, and transmitting for each of the plurality of destination devices. In some embodiments, the network device and the plurality of destination devices are provider edge (PE) devices on the MPLS network.

In some embodiments, the VLAN tag that is generated from the VLAN tag in the ingress packet is based on the second port being an egress port of the egress packet.

In accordance with the present disclosure, a method in a network device on an MPLS network including using first pipeline circuitry of the network device to process a received packet; and using second pipeline circuitry of the network device different from the first pipeline circuitry to generate an egress packet from the received packet, including: modifying a VLAN tag contained in the received packet, the egress packet containing the modified VLAN tag; and pushing an MPLS label onto the egress packet that is determined based on an ingress port of the network device on which the received packet ingressed; and transmitting the egress packet to a destination device, the egress packet transmitted on an egress port of the network device different from the ingress port.

In some embodiments, the ingress port is associated with an Ethernet segment (ES), wherein the MPLS label is an ES identifier label that identifies the ES when the destination device is connected to the same ES that the ingress port is associated with.

In some embodiments, the VLAN tag that is generated from the VLAN tag in the received packet is based at least on the egress port.

In some embodiments, the received packet is a flood packet, the method further comprising identifying a plurality of destination devices and repeating the modifying, pushing, and transmitting for each of the plurality of destination devices. In some embodiments, the network device and the plurality of destination devices are provider edge (PE) devices on the MPLS network.

In some embodiments, the first pipeline circuitry is on an IC chip different from an IC chip of the second pipeline circuitry.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device on a Layer 2 Ethernet Virtual Private Network Multi-Protocol Label Switching (L2 EVPN MPLS) network, the method comprising:
   (a) receiving an ingress packet on a (ingress) port that is associated with a plurality of Ethernet segments (ES's);
   (b) determining an (ingress) ES, from among the plurality of ES's, based on the ingress port on which the ingress packet was received;
   (c) selecting a destination device from among a plurality of destination devices;
   (d) in response to the selected destination device being associated with the ingress ES, pushing the ingress ES on the egress packet as a first MPLS label;
   (e) pushing a second MPLS label on an egress packet, the second MPLS label based on the selected destination device; and
   (f) transmitting the egress packet to the selected destination device.

2. The method of claim 1, wherein the ingress port is a subinterface among a plurality of subinterfaces defined on a physical port of the network device.

3. The method of claim 1, wherein the method further includes using the ingress ES and the selected destination device as lookup key in a database to access the first MPLS label.

4. The method of claim 1, wherein the ingress packet is a flood packet, the method further comprising repeating steps (b) to (f) for each destination device in the plurality of destination devices.

5. The method of claim 1, wherein the ingress packet is received in an ingress pipeline circuit, wherein the ingress packet is a flood packet, the method further comprising:
   identifying an egress pipeline circuit from a plurality of egress pipeline circuits separate from the ingress pipeline circuit based on the ingress packet; and
   repeating steps (b) to (f) for each identified egress pipeline circuit.

6. The method of claim 1, wherein the ingress packet is a flood packet, wherein the selected destination device receives the egress packet from the network device and uses the ESI label therein to determine Ethernet segments on which to forward the packet.

7. The method of claim 1, wherein the network device and the plurality of destination devices are provider edge (PE) devices on the L2 EVPN MPLS network.

8. A network device comprising:
   one or more computer processors; and
   a computer-readable storage device comprising instructions for controlling the one or more computer processors to:
   (a) receive an ingress packet on a (ingress) port that is associated with a plurality of Ethernet segments (ES's);
   (b) determine an (ingress) ES, from among the plurality of ES's, based on the ingress port on which the ingress packet was received;
   (c) select a destination device from among a plurality of destination devices;
   (d) in response to the selected destination device being associated with the ingress ES, push the ingress ES on the egress packet as a first MPLS label;

(e) push a second MPLS label on an egress packet, the second MPLS label based on the selected destination device; and (f) transmit the egress packet to the selected destination device.

9. The network device of claim 8, wherein the ingress port is a subinterface among a plurality of subinterfaces defined on a physical port of the network device.

10. The network device of claim 8, wherein the computer-readable storage device further comprises instructions for controlling the one or more computer processors to use the ingress ES and the selected destination device as lookup key in a database to access the first MPLS label.

11. The network device of claim 8, wherein the ingress packet is a flood packet wherein the computer-readable storage device further comprises instructions for controlling the one or more computer processors to repeat steps (b) to (f) for each destination device in the plurality of destination devices.

12. The network device of claim 8, wherein the ingress packet is received in an ingress pipeline circuit, wherein the ingress packet is a flood packet, wherein the computer-readable storage device further comprises instructions for controlling the one or more computer processors to:

identify an egress pipeline circuit from a plurality of egress pipeline circuits separate from the ingress pipeline circuit based on the ingress packet; and repeat steps (b) to (f) for each identified egress pipeline circuit.

13. The network device of claim 8, wherein the ingress packet is a flood packet, wherein the selected destination device receives the egress packet from the network device and uses the ESI label therein to determine Ethernet segments on which to forward the packet.

14. A method in a network device on an Ethernet virtual private network (EVPN) Layer 2 (L2) multi-protocol label switching (MPLS) network, the method comprising:

receiving an ingress packet on an ingress pipeline;

accessing an ingress database associated with the ingress pipeline using information in the ingress packet to identify an egress pipeline separate from the ingress pipeline;

accessing an egress database associated with the identified egress pipeline using a virtual local area network (VLAN) bridge identifier associated with the ingress packet to identify one or more VLAN tag manipulation actions;

using the VLAN tag manipulation actions to produce a modified ingress packet, including at least one of adding VLAN tags, deleting VLAN tags, changing VLAN tags, and changing between single-tagged and double-tagged formats; and transmitting the modified ingress packet on a port associated with the identified egress pipeline.

15. The method of 14, wherein accessing an ingress database and accessing an egress database are performed in the ingress pipeline, wherein using the VLAN tag manipulation actions is performed in the egress pipeline.

16. The method of 14, wherein the ingress database is accessed using content in the ingress packet to identify the egress pipeline from a plurality of egress pipelines separate from the ingress pipeline.

17. The method of 14, further comprising, in the ingress pipeline, accessing edit actions from the ingress database and editing the ingress packet using the accessed edit actions, wherein the VLAN tag manipulation actions are applied to the edited ingress packet, in the identified egress pipeline, to produce the modified ingress packet.

18. The method of 14, further comprising, in the ingress pipeline, identifying the VLAN bridge identifier based on a VLAN identifier (VID) contained in the ingress packet.

19. The method of 14, wherein the network device is a provider edge (PE) device on the EVPN L2 MPLS network.

20. The method of 14, further comprising:

pushing at least one MPLS label onto the modified ingress packet; and transmitting the modified ingress packet to a destination device on the MPLS network.

* * * * *